United States Patent
Zhang et al.

(10) Patent No.: US 11,803,232 B2
(45) Date of Patent: Oct. 31, 2023

(54) TOUCH DISPLAY SYSTEM AND CONTROL METHOD THEREOF

(71) Applicant: BOE TECHNOLOGY GROUP CO., LTD., Beijing (CN)

(72) Inventors: Xiao Zhang, Beijing (CN); Yushun Jie, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/414,375

(22) PCT Filed: Dec. 29, 2020

(86) PCT No.: PCT/CN2020/140694
§ 371 (c)(1),
(2) Date: Jun. 16, 2021

(87) PCT Pub. No.: WO2021/169569
PCT Pub. Date: Sep. 2, 2021

(65) Prior Publication Data
US 2022/0164049 A1 May 26, 2022

(30) Foreign Application Priority Data
Feb. 26, 2020 (CN) .......................... 202010119465.4

(51) Int. Cl.
*G06F 3/042* (2006.01)
*G06F 21/32* (2013.01)
(Continued)

(52) U.S. Cl.
CPC ............ *G06F 3/011* (2013.01); *G06F 3/0416* (2013.01); *G06F 3/0428* (2013.01);
(Continued)

(58) Field of Classification Search
CPC ...... G06F 3/0412; G06F 3/011; G06F 3/0416; G06F 3/0428; G06F 40/103;
(Continued)

(56) References Cited

U.S. PATENT DOCUMENTS 8,400,406 B1\* 3/2013 Kurtz .................... G06F 3/0428
345/173
9,582,188 B2 2/2017 Kim et al.
(Continued)

FOREIGN PATENT DOCUMENTS

| CN | 102478997 A | 5/2012 |
|---|---|---|
| CN | 104714731 A | 6/2015 |

(Continued)

OTHER PUBLICATIONS

Secon office action issued in Chinese Patent Application No. 202010119465.4 with search report.

*Primary Examiner* — Julie Anne Watko
(74) *Attorney, Agent, or Firm* — Chiwin Law LLC

(57) ABSTRACT

A touch display system and a control method thereof are provided. The touch display system includes a touch display panel and a controller. The touch display panel includes a touch area and is configured to sense a touch operation of a user. The controller is coupled with the touch display panel and is configured to acquire a physical sign information of the user who is to operate the touch display panel, and adjust a touch range for the user to perform the touch operation in the touch area according to the physical sign information of the user.

18 Claims, 6 Drawing Sheets

(51) Int. Cl.
*G06V 40/10* (2022.01)
*G06F 3/01* (2006.01)
*G06F 3/041* (2006.01)
*G06F 3/03* (2006.01)

(52) U.S. Cl.
CPC .......... *G06V 40/103* (2022.01); *G06V 40/107* (2022.01); *G06F 3/0304* (2013.01); *G06F 21/32* (2013.01)

(58) Field of Classification Search
CPC .... G06F 40/107; G06F 3/0304; G06F 3/0425; G06F 21/32; G06V 40/103; G06V 40/107; G06V 40/10
See application file for complete search history.

(56) References Cited

U.S. PATENT DOCUMENTS

| | | | |
|---|---|---|---|
| 10,732,760 B2 | 8/2020 | Nam et al. | |
| 2009/0070670 A1* | 3/2009 | Kishi | G06F 3/04886 715/702 |
| 2011/0096028 A1* | 4/2011 | Zhao | G06F 3/0428 345/175 |
| 2011/0096029 A1* | 4/2011 | Zhao | G06F 3/0428 345/175 |
| 2011/0169749 A1* | 7/2011 | Ganey | G06F 1/1626 345/173 |
| 2011/0304550 A1* | 12/2011 | Romera Jolliff | G06F 3/016 715/810 |
| 2012/0075194 A1* | 3/2012 | Ferren | G03B 3/00 345/168 |
| 2013/0120292 A1* | 5/2013 | Gwak | G06F 3/04883 345/173 |
| 2013/0237288 A1* | 9/2013 | Lee | G06F 3/0482 455/566 |
| 2014/0204063 A1* | 7/2014 | Kaida | G06F 3/0393 345/184 |
| 2015/0177826 A1 | 6/2015 | Aizawa | |
| 2015/0213244 A1* | 7/2015 | Lymberopoulos | G06F 21/32 726/19 |
| 2017/0269771 A1* | 9/2017 | Nam | G06F 3/0416 |

FOREIGN PATENT DOCUMENTS

| | | | |
|---|---|---|---|
| CN | 105144066 A | 6/2016 | |
| CN | 107219915 A | 9/2017 | |
| CN | 111309183 A | 6/2020 | |
| EP | 3067788 A1 * | 9/2016 | ............. B60K 35/00 |
| WO | 2018098953 A1 | 6/2018 | |

* cited by examiner

TOUCH DISPLAY SYSTEM AND CONTROL METHOD THEREOF

This application is a U.S. National Phase Entry of International Application No. PCT/CN2020/140694 filed on Dec. 29, 2020, designating the United States of America and claiming priority to Chinese Patent Application No. 202010119465.4, filed on Feb. 26, 2020. The present application claims priority to and the benefit of the above-identified applications and the above-identified applications are incorporated by reference herein in their entirety.

TECHNICAL FIELD

Embodiments of the present disclosure relate to a touch display system and a control method thereof.

BACKGROUND

Touch Screen, also known as "touch panel", is an inductive display device that can receive input signals input by users through touch. Touch screens are used in many electronic devices to display graphics and text, and provide user interfaces for users to interact with electronic devices. A touch screen detects and responds to a touch operation on the touch screen. Electronic devices can display one or more soft keys, menus, and other user interface objects on the touch screen. The user interacts with the electronic device by touching the position of the interface object, sliding, clicking, pressing and so on. For example, large-sized touch screens can be set up in classrooms and conference rooms, which is convenient for users to directly interact with the touch screens for teaching and meetings through writing on the touch screens.

SUMMARY

At least one embodiment of the present disclosure provides a touch display system, comprising: a touch display panel, comprising a touch area and configured to sense a touch operation of a user; a controller, coupled with the touch display panel, configured to acquire a physical sign information of the user who is to operate the touch display panel, and adjust a touch range for the user to perform the touch operation in the touch area according to the physical sign information of the user.

For example, the touch display system provided by at least one embodiment of the present disclosure further comprises: at least one light emitter and at least one light receiver arranged at a periphery of the touch display panel. The at least one light emitter and the at least one light receiver are respectively coupled with the controller. The controller is configured to acquire a light information of the at least one light receiver, determine, according to the light information, a first light emitter corresponding to light blocked by the user and a second light emitter which is around the first light emitter and corresponds to light unblocked by the user, and determine projection positions of the physical sign information of the user on the touch display panel according to the first light emitter and the second light emitter. The controller is further configured to determine the touch range according to the projected positions of the physical sign information of the user on the touch display panel. The physical sign information of the user comprises a relative height between a head top of the user and the ground where the touch display panel is located, the at least one light emitter is configured to emit non-visible light, and the at least one light receiver is configured to receive the non-visible light.

For example, in the touch display system provided by at least one embodiment of the present disclosure, the controller is configured to acquire the physical sign information of the user to operate the touch display panel comprises: acquiring the physical sign information of the user close to the touch area in real time.

For example, the touch display system provided by at least one embodiment of the present disclosure further comprises: an image acquisition device, coupled to the controller and configured to acquire a user image information, the user image information comprising the user close to the touch area. The controller is configured to acquire the physical sign information of the user according to the user image information.

For example, the touch display system provided by at least one embodiment of the present disclosure further comprises: a distance measuring device, configured to obtain a horizontal distance between the user and the touch display panel. The controller is further coupled with the distance measuring device and configured to acquire the physical sign information of the user relative to the touch area according to the horizontal distance. The physical sign information comprises a relative height of at least one of the head top, shoulders, elbows, and wrists of the user relative to the ground where the touch display panel is located.

For example, in the touch display system provided by at least one embodiment of the present disclosure, the image acquisition device is further configured to acquire the user image information of the user in front of a display side of the touch display panel, and the controller is further configured to acquire the relative height of at least one of the head top, the shoulders, the elbows, and the wrists of the user relative to the ground where the touch display panel is located according to the user image information.

For example, in the touch display system provided by at least one embodiment of the present disclosure, the distance measuring device is further configured to acquire one or more horizontal distances between the user in front of the touch display panel and one or more positions at the display side of the touch display panel, and the controller is further configured to acquire the relative height of at least one of the head top, the shoulders, the elbows, and the wrists of the user relative to the ground where the touch display panel is located according to the one or more horizontal distances and the user image information.

For example, in the touch display system provided by at least one embodiment of the present disclosure, the controller is further configured to determine, according to the user image information, a position information of at least one of the head top, the shoulders, the elbows, and the wrists of the user relative to the image acquisition device by using image recognition method, and obtain relative positions of the head top, the shoulders, the elbows, and the wrists of the user relative to the ground where the touch display panel is located according to the position information, the one or more horizontal distances between the user and the touch display panel, and a relative height of the image acquisition device relative to the ground where the touch display panel is located.

For example, in the touch display system provided by at least one embodiment of the present disclosure, the distance measuring device comprises at least two cameras at different positions, and the at least two cameras are provided on the touch display panel and separated from each other, and the controller is configured to calculate and acquire the one or more horizontal distances between the user in front of the touch display panel and the one or more positions at the display side of the touch display panel through user image information simultaneously captured by the at least two cameras.

For example, in the touch display system provided by at least one embodiment of the present disclosure, the controller is configured to adjust the touch range for the touch operation of the user in the touch area, comprises: acquiring the touch range for the user in the touch area based on the relative height of at least one of the head top, the shoulders, the elbows, and the wrists of the user relative to the ground where the touch display panel is located.

For example, in the touch display system provided by at least one embodiment of the present disclosure, the controller is configured to adjust the touch range for the user in the touch area according to the physical sign information of the user relative to the touch area, comprising: acquiring the relative height of at least one of the head top, the shoulders, the elbows, and the wrists of the user in front of the display side of the touch display panel relative to the ground where the touch display panel is located; according to the relative height of the head top, determining a same height position at the touch display panel relative to the ground where the touch display panel is located, and setting the same height position as a display position corresponding to the head top; setting a difference between the relative heights of the shoulders and the wrists of the user as a first length; setting a difference between the relative heights of the head and the elbows of the user as a second length; and setting the display position corresponding to the head top as adjusted touch starting point coordinate, and determining the touch range of the user by the first length and the second length. The touch range of the user comprises a rectangular range with the first length used as one side length and the second length used as an adjacent other side length, and the touch starting point coordinate used as an upper vertex of the rectangular range.

For example, in the touch display system provided by at least one embodiment of the present disclosure, after determine the adjusted touch range, the controller is further configured to adjust, according to the position of the touch operation within the touch range, a display mode of content to be displayed in the touch range in response to the touch operation, in a case where the user performs the touch operation within the adjusted touch range.

For example, in the touch display system provided by at least one embodiment of the present disclosure, the controller is further configured to display a written content in a new line, in a case where the user performs a writing operation within the adjusted touch range and the written content in the touch range is located at a boundary of the touch range.

For example, in the touch display system provided by at least one embodiment of the present disclosure, the physical sign information further comprises a commonly-used hand information of the user. The controller is further configured to acquire the commonly-used hand information of the user. In a case where the commonly-used hand information of the user is right handed, the touch starting point coordinate comprises an upper left vertex of the rectangular range, and in a case where the commonly-used hand information of the user comprises a left hand, the touch starting point coordinate comprises an upper right vertex of the rectangular range.

For example, the touch display system provided by at least one embodiment of the present disclosure further comprises: a storage device, and the storage device comprises a user information base. The user information base comprises an identity information of the user and the physical sign information of the user, and the identity information comprises an identity authentication information of the user, and the identity authentication information comprises a biometric information of the user or a password information for logging into a database.

For example, in the touch display system provided by at least one embodiment of the present disclosure, the controller is further configured to acquire the physical sign information of the user prestored in the user information base.

For example, in the touch display system provided by at least one embodiment of the present disclosure, the controller is further configured to acquire the identity information of the user and the physical sign information corresponding to the identity information of the user, before acquiring the pre-stored physical sign information.

For example, in the touch display system provided by at least one embodiment of the present disclosure, the controller is further configured to determine whether boundary coordinates of the adjusted touch range exceed the touch area. In a case where the boundary coordinates of the adjusted touch range exceed the touch area, a reminding message is send to remind the user to move a position of a body or an arm, and the rectangular range is re-determined, so that the touch range of the rectangular range is all within the touch area of the touch display panel.

For example, in the touch display system provided by at least one embodiment of the present disclosure, the controller is further configured to start adjusting the touch range for the user who is to perform the touch operation in the touch area, according to an input instruction for adjusting the touch range called by the user.

At least one embodiment of the present disclosure provides a control method of a touch display system, the method being adapted to a touch display system with a touch display panel and comprising: acquiring a physical sign information of a user who is to operate the touch display panel, and according to the physical sign information of the user, adjusting a touch range for the user to perform a touch operation in the touch area of the touch display panel.

BRIEF DESCRIPTION OF THE DRAWINGS

In order to clearly illustrate the technical solution of the embodiments of the present disclosure, the drawings of the embodiments will be briefly described. It is obvious that the described drawings in the following are only related to some embodiments of the present disclosure and thus are not limitative of the present disclosure.

DETAILED DESCRIPTION

Figure 1:
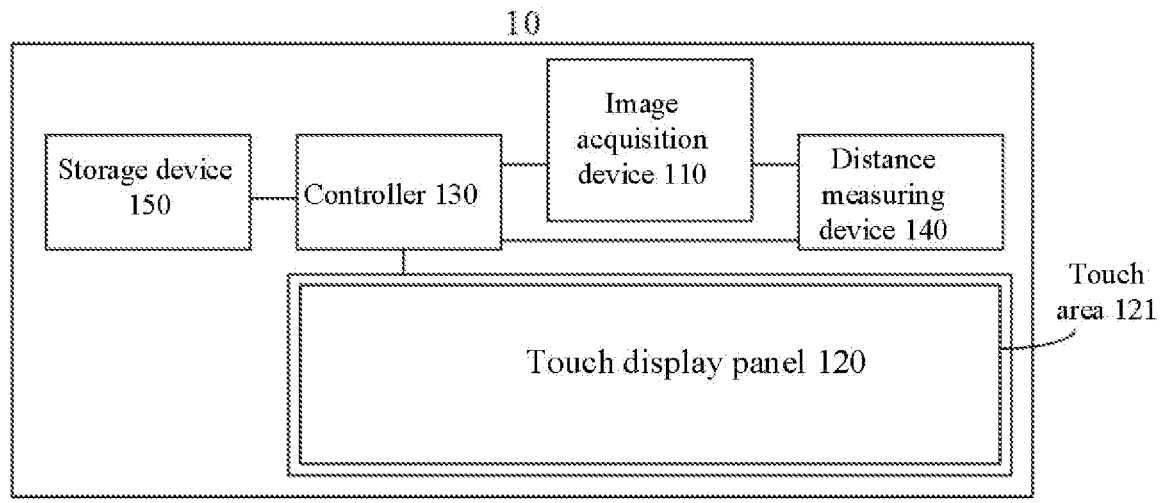
FIG. 1 is a schematic block diagram of a touch display system according to at least one embodiment of the present disclosure.

In order to make objectives, technical details, and advantages of the embodiments of the present disclosure more apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first", "second", etc., which are used in the present disclosure, are not intended to indicate any sequence, amount or importance, but distinguish various components. Similarly, similar terms such as "a", "an", or "the", etc., do not indicate the limitation of quantity, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects.

Touch screen, as an inductive display device, receives input signals from users through touch. The touch screen combines display technology, touch control technology, and communication technology, and thus has many functions such as display, writing, conference video, etc., and has many advantages such as quick response and easy interaction. At present, touch screens are used by various display devices in different business scenarios, such as electronic whiteboard with writing applications, conference machines with writing, video and file management applications, etc., which can solve the paperless problem well and are increasingly used in office, conference and teaching scenarios. In the above scenarios, the touch screens are mostly vertical touch screens with large sizes (for example, 55 inches, 65 inches, 75 inches, 85 inches, or 98 inches, etc.), and users usually need to demonstrate and write on the touch screens at close range. The size of the touch screen is selected according to the size of the field space in practical application scenarios (such as office, conference and teaching, etc.). In the case where economic conditions permit, the larger the field space requires, the larger the size of the touch screen is.

In the process of using a display device with a touch screen, in order to communicate better, users usually need to perform touch operations at close range, such as text writing, annotation, document display and other scenes. However, for large-sized touch screens, it is difficult for users to operate the entire range of the touch area on the screen. For example, some users are difficult to operate the top of the screen because their height is lower than the top of the screen. Some users cannot operate the bottom of the screen because their height is higher than the top of the screen.

In this way, a liftable touch screen is used to solve the above problems. By installing a liftable device (for example, a liftable bracket) for the touch screen, users can adjust the height of the touch screen according to their own needs, so that users with different heights can operate the touch screen in the whole range of the touch area of the touch screen. However, the above-mentioned lifting device occupies a large space and needs to increase the hardware cost, such as increasing the cost of motor, slide rail, locking device, etc. Under this case, there may be problems such as long adjustment time and noise during using the motor. In addition, in the case that multiple people need to demonstrate in a certain period of time, frequent adjustments wastes too much time, so there are many inconveniences in the process of using the large-size touch screen, which makes the user experience poor.

At least one embodiment of the present disclosure provides a touch display system. The touch display system includes a touch display panel and a controller. The touch display panel includes a touch area and is configured to sense a touch operation of a user. The controller is coupled with the touch display panel and is configured to acquire a physical sign information of a user who is to operate the touch display panel and adjust a touch range for the user to perform the touch operation in the touch area according to the physical sign information of the user.

The touch display system is, for example, a product in conference or teaching scenes such as electronic whiteboard or conference machine, and the hardware type of the product is not limited. For example, the hardware type of the product may be a display product such as a liquid crystal display, an OLED display, or may be a writing display product such as electromagnetic induction technology.

The touch display system provided in the above embodiments of the present disclosure can adjust the touch range for the user in the touch area according to the physical sign information of the user, so that the user with different physical sign information can conveniently operate the touch display system, thus for example, being suitable for large-sized touch devices.

The physical sign information is used to express the biometric information of the user who needs to operate the display panel in front of the touch display system, so as to identify different users and further identify the relative height between the user and the display.

In some embodiments, the physical sign information is information that directly expresses the relative height between the user and the display, such as the height of the user, the shoulder height of the user, or the arm height of the user in the case where the base of the display stands on the same horizontal plane as the user.

The physical sign information is used to express the height information of the preset parts (such as the head top, shoulders, arms, etc.) of the user who needs to operate the display panel in front of the touch display system relative to the sky side and the ground side of the display panel. Alternatively, the physical sign information is used to express the height information and the shortest distance between the left side and the right side of the preset parts (such as the head top, shoulders, arms, etc.) of the user who needs to operate the display panel in front of the touch display system.

For example, the height of the bracket of the display is 1.2 m, the distance between the sky side of the display and the ground side of the display is 2 m, and the distance between the sky side and the ground is 3.2 m. In the case where the user's height is 1.6 m, the physical sign information is the distance between the head top of the user and the top of the display, which is 3.2-1.6=1.6 m, and the distance between the ground and the user; alternatively, the physical information is the height of the user is 1.6 m, or the distance between the user's arm and the top of the display.

At least one embodiment of the present disclosure further provides a control method of a touch display system. The control method of the touch display system is adapted to the afore-mentioned touch display system with the touch display panel, and includes: acquiring the physical sign information of the user, and according to the physical sign information of the user, adjusting the touch range for the user to perform the touch operation in the touch area of the touch display panel.

Hereinafter, various embodiments of the present disclosure and examples thereof will be described in detail without limitation with reference to the accompanying drawings.

At least one embodiment of the present disclosure provides a touch display system. FIG. 1 is a schematic block diagram of a touch display system according to at least one embodiment of the present disclosure.

As shown in FIG. 1, the touch display system 10 includes a touch display panel 120 and a controller 130. The touch display panel 120 is coupled to the controller 130. The touch display panel 120 includes a touch area 121, and is configured to sense a touch operation of the user. For example, the size of the touch area 121 is 55 inches, 65 inches, 75 inches, 85 inches, or 98 inches. The controller 130 is configured to acquire the physical sign information of the user who is to operate the touch display panel 120, and adjust the touch range for the user to perform the touch operation in the touch area 121 according to the physical sign information of the user.

The physical sign information can be pre-stored or acquired in real time.

In some embodiments, for example, the physical sign information of the user touching the display panel 120 may be pre-stored physical sign information of the user, such as height of body, shoulders, or elbows, etc. The height information is stored for users correspondingly, and each user has a unique identity mark. Before obtaining pre-stored physical sign information, it is necessary to obtain the identity of the current user, such as fingerprint or iris, by using identity mark acquiring method.

In some embodiments, in the case where the user stands in front of the touch display panel 120, the controller 130 controls the camera or sensor to obtain the physical sign information of the user in real time.

In some embodiments, a height input prompt box or voice prompt is displayed on the screen, and the user inputs the physical sign information such as human height through the screen or voice.

It should be noted that the touch display panel 120 may be an in-cell or on-cell display panel with touch and display functions, and the touch area is an area with touch and display functions. The in-cell touch display panel, for example, by means of circuit sharing, embeds the circuit for realizing touch function into the interior of the display area of the display panel to realize dual functions of touch and display. The on-cell touch display panel has a circuit for realizing the touch function, and the circuit is for example, by gluing, etc., stacked on the outside of the display panel with the display function, so as to realize the dual functions of touch and display. In this way, the user performs touch operation for the touch area, and the prompt box for the touch operation or the result of the touch operation can be directly displayed in the touch area.

For example, the touch display system 10 is an upright touch screen, which is fixed on a bracket or hung on a vertical wall, and the user stands in front of the touch display system 10 and performs touch operation with his/her hand or stylus pen.

For example, in some examples, the touch range is all or part of the touch area, and the user operates the touch display system 10 within the touch range, including writing characters, pictures, etc., and operations during calling out or exiting applications or functions such as sliding, clicking, long pressing, etc., thereby realizing interaction, etc. Because the position of these operation functions on the touch display panel (too high or too far away from the user) may bring inconvenience to the user (limitation of height, arm length, etc.), it is necessary to adjust the touch range. For example, the touch area of the touch display panel 120 may cover the entire touch display panel 120.

For example, in some embodiments, adjusting the touch range in the touch area 121 for the user has different schemes in different scenes. For example, the adjusted touch range may be all of the touch area 121 of the touch display panel 120, or may be a part of the touch area 121 of the touch display panel 120, so that the user can conveniently operate the touch display system 10 within the touch range. For another example, adjusting the touch range specifically refers to adjusting the touch range of some application windows, adjusting the touch range of the display desktop, or adjusting the touch range of documents. Adjusting the touch range is to move the position of the window to the position that the user can touch, or to reduce the proportion of the window so that the reduced touch range is located at the position that the user can touch. After adjusting the touch range, the original window can remain unchanged or be closed, that is to say, a new adjusted window is superimposed on the original touch screen or directly closed, so that the window serves as the adjusted touch range of a user.

For example, the touch display panel 120 directly or indirectly transmits the sensed touch information to the controller 130, and the controller 130 determines what operation to perform through the acquired touch information according to the currently running application program. For example, the written information of the user within the touch range is collected and identified, and further displayed on the matched touch display panel 120. For example, the touch display panel 120 captures the written information within the touch range, the written information is scaled to the required font by the controller 130 according to the font size selected by the user and the ratio of the actual written information. For example, the enlarged written information is displayed from the upper left corner of the entire display area of the touch display panel 120.

For example, the touch display panel 120 may be a liquid crystal display panel, an organic light-emitting diode display panel, an inorganic light-emitting diode display panel, which have touch and display functions. The modules (or circuits) for realizing the touch function are resistive, capacitive, infrared, surface acoustic wave, etc., and are integrated into the display area of the display panel by on-cell or in-cell manner to realize the touch and display functions. Embodiments of the present disclosure do not limit the types of touch display panels.

According to the touch display system provided in the above embodiments of the present disclosure, by acquiring the physical sign information of the user who is to operate the touch display panel 120 and adjusting the touch range in the touch area 121 according to the physical sign information of the user, users with different physical sign information (for example, users with different heights and arm lengths) can conveniently operate the touch display system 10. In this way, for example, the touch display system is suitable for large-sized touch devices.

For example, in some embodiments, the controller 130 is configured to acquire the physical sign information of a user who is to operate the touch display panel 120 with respect to the touch area 121. For example, the controller 130 acquires the physical sign information of a user standing in front of the touch display panel 120 in real time. The touch display panel 120 may be movable, and the controller 130 may also measure the physical sign information of the user according to the change of the position of the touch display panel 120. For example, the controller 130 adjusts the touch range of the user in the touch area 121 according to the physical sign information of the user relative to the touch area 121, so that the adjusted touch range can meet the user's touch demand, such as being suitable for the upper and lower ranges or the left and right ranges in the case where a person stands.

For example, in some embodiments, in the case where the user stands in front of the touch display panel 120, the controller 130 controls a sensor acquisition device to collect the physical sign information of the user in real time. As shown in FIG. 1, the touch display system 10 may further include an image acquisition device 110. The image acquisition device 110 is coupled to the controller 130, and is configured to acquire image information of a user and provide the image information to the controller 130 directly or indirectly through a signal line (e.g., a bus). The controller 130 can acquire the physical sign information of the user according to the image information of the user. For example, the image acquisition device 110 may include a camera, which is configured to acquire user image information.

For example, the camera includes a CCD (Charged Coupled Device) image sensor, a CMOS (Complementary Metal-Oxide-Semiconductor) image sensor, or other image acquisition devices for collecting information of surrounding environment. Embodiments of the present disclosure do not limit the structure (e.g., image sensor, lens, etc.) and specifications (e.g., resolution, etc.) of the camera.

For example, the controller 130 may be a central processing unit (CPU), a digital signal processor (DSP), a programmable logic controller (PLC), etc., which is not limited by embodiments of the present disclosure.

For example, in some embodiments, when the user stands in front of the touch display panel 120, the controller 130 controls the physical sign information of the user acquired by the sensor acquisition device in real time. As shown in FIG. 1, the touch display system 10 may further include a distance measuring device 140. The distance measuring device 140 is configured to acquire the horizontal distance between the user and the touch display panel 120. The controller 130 is also coupled to the distance measuring device 140, and is configured to acquire the physical sign information of the user relative to the touch area 121 according to the horizontal distance. For example, the distance measuring device 140 may also be connected with the image acquisition device 110. The distance measuring device 140, for example, includes an infrared ranging device, which is configured to obtain the horizontal distance between the user and the touch display panel 120.

In other embodiments, in the case where the user stands in front of the touch display panel 120, the controller 130 controls the physical sign information of the user acquired by the image acquisition device and the sensor acquisition device in real time. The information collected by the image acquisition device and the information collected by the sensor acquisition device are compared, and the height result of the corresponding user of one of the two acquisition devices is corrected or optimized.

In some embodiments, the physical sign information of the user may include the relative height between at least one of the head top, shoulders, elbows, and wrists of the user and the ground where the touch display panel 120 is located.

For example, in some examples, the physical sign information of the user may further include the user's commonly-used hand information, such as left handed or right handed, or a commonly-used finger.

For example, in some examples, the image acquisition device 110 is further configured to acquire the user image information of the user in front of the display side of the touch display panel 120. The controller 130 is further configured to obtain the relative height of at least one of the head top, shoulders, elbows, and wrists of the user relative to the ground where the touch display panel 120 is located according to the user image information, for example, by adopting an image recognition method.

Figure 3A:
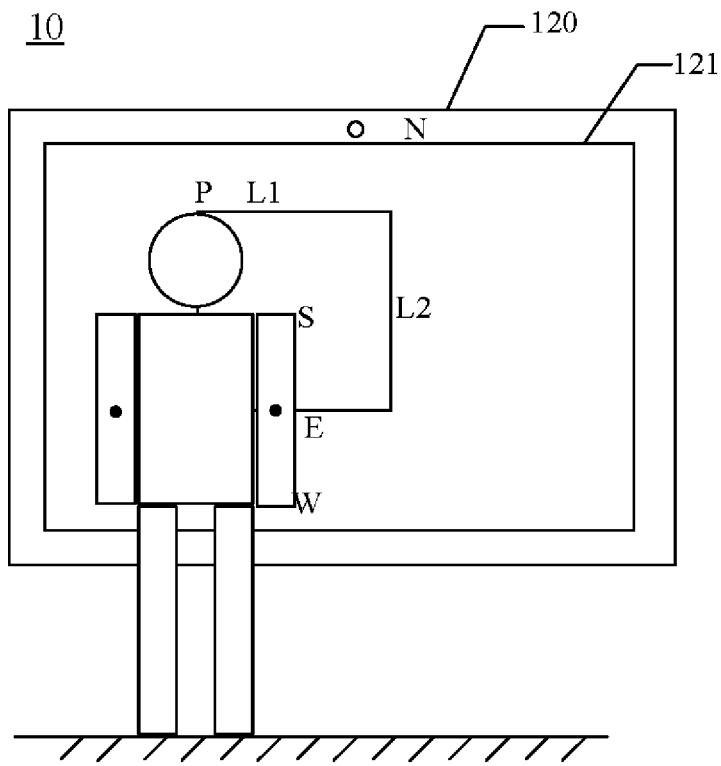
FIG. 3A is a schematic diagram of a user standing in front of a vertically placed touch display system according to at least one embodiment of the present disclosure.

As shown in FIG. 3A, the image acquisition device 110 includes a depth camera N. The user stands in front of the vertically placed touch display system 10, with the front or the back of the user facing the touch display panel 120 of the touch display system 10 and the front or the back of the user being parallel to the touch display panel 120. The plane on which the user stands is also the ground where the touch display panel 120 is located, that is, the user and the touch display panel 120 are on the same horizontal plane. The user's body and arms are perpendicular to the ground. For example, the touch display system 10 acquires the user image information of the user in front of the touch display panel 120 of the touch display system 10 through the camera N, and determines the positions of the head top P, shoulder S, elbow E, and wrist W of the user from the user image information by using an image recognition method. The camera N may be located at the center of the top of the touch display panel 120, that is, at point N in FIG. 3A, which is higher than the head top P of the user. For example, the camera N may be provided integrally with the touch display panel 120 or separately from the touch display panel 120.

The relative height of at least one of the head top P, the shoulder S, the elbow E, and the wrist W obtained by the embodiments of the present disclosure has no relationship with the orientation of the body in the length direction (direction parallel to the ground) relative to the touch display panel 120 of the touch display system 10 in the case where the user stands upright, and the embodiments of the present disclosure is not limited thereto.

Figure 4:
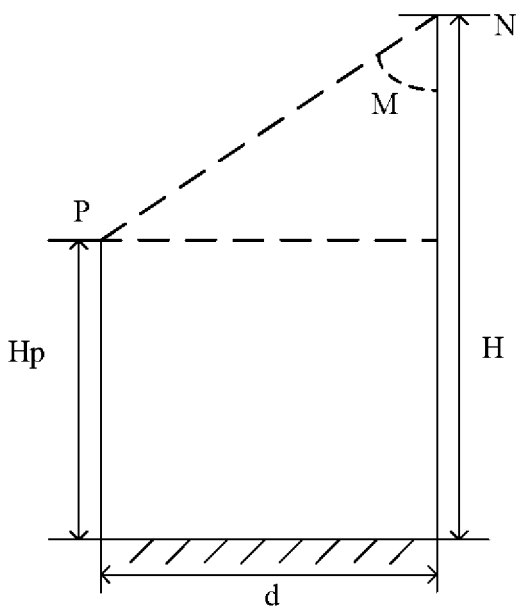
FIG. 4 is a schematic diagram for calculating the horizontal distance between a user and a touch display panel according to at least one embodiment of the present disclosure.

For example, in some embodiments, as shown in FIG. 3A and FIG. 4, the distance measuring device 140 is further configured to obtain one or more horizontal distances between the user in front of the touch display panel 120 and one or more positions at the display side of the touch display panel 120. The controller 130 is further configured to acquire the relative height of at least one of the head top P, shoulder S, elbow E, and wrist W of the user relative to the ground where the touch display panel 120 is located according to the horizontal distance and the user image information.

For example, as shown in FIG. 3A and FIG. 4, the controller 130 is further configured to determine the position information of the head top P, shoulder S, elbow E, and wrist W of the user relative to the image acquisition device 110 by using the image recognition method according to the user image information, and to obtain the relative heights of the head top P, shoulders S, elbows E, and wrists W of the user relative to the touch display panel 120 according to the position information, the horizontal distance d between the user and the touch display panel, and the relative heights of the ground where the image acquisition device 110 is located relative to the touch display panel 120.

The vertical height H of the image acquisition device 110, i.e., the camera N in FIG. 3A, from the ground (i.e., the relative height of the ground where the image acquisition device 110 is located relative to the touch display panel 120) can be measured after the touch display system 10 is installed. Or, in the case where the ground is a horizontal surface, the bracket or vertical wall for the touch display system 10 is at the same level as the user, so that there is no need to measure the absolute value of the vertical height H. A distance measuring device 140, such as an infrared distance measuring device, obtains the horizontal distance d between the user in front of the touch display panel 120 and the touch display panel 120. By using the image recognition method, the head top P of the user is determined according to the user image information acquired by the image acquisition device 110 (camera N), and the position information of the head top P relative to the image acquisition device 110 is calculated. For example, the included angle M of the head top P relative to the camera N on the touch display system 10 is calculated. According to the included angle M, the horizontal distance d between the user and the touch display panel, and the vertical height H between the image acquisition device 110 and the ground, the height Hp of the ground where the head top of the user is located relative to the touch display panel 120 can be obtained according to the following formula.

$$H_p = H - \frac{d}{\tan M} \quad (1)$$

With the same calculation method as the above head top P, the height Hs of the shoulder S of the user relative to the ground where the touch display panel 120 is located is obtained, the height He of the elbow E of the user relative to the ground where the touch display panel 120 is located is obtained, and the height Hw of the wrist W relative to the ground where the touch display panel 120 is located is obtained is obtained. The height difference between the head top of the user and the elbow of the user is: $H_p - H_e$. The height difference between the shoulder of the user and the wrist of the user is: $H_s - H_w$.

For example, in some embodiments, the distance measuring device 140 includes at least two cameras. The at least two cameras are separately arranged at the touch display panel 120. The controller 130 is configured to calculate and obtain one or more horizontal distances between the user in front of the touch display panel 120 and one or more positions at the display side of the touch display panel 120 through the user image information simultaneously captured by the two cameras. Please note that "simultaneously capturing" here also includes "basically simultaneously capturing", that is, the capturing time of two cameras is allowed to be slightly different, as long as it does not hinder the subsequent calculation.

Figure 3B:
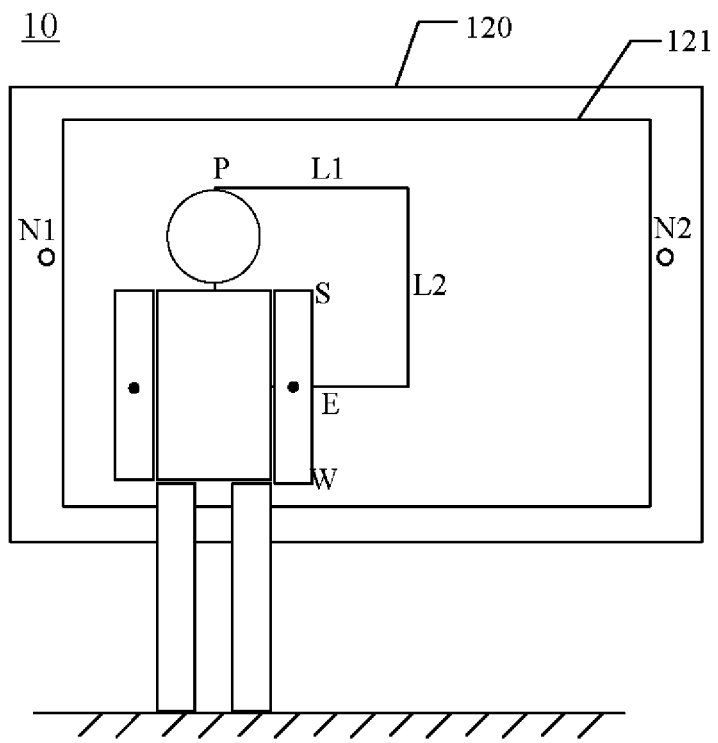
FIG. 3B is a schematic diagram of a user standing in front of a vertically placed touch display system according to at least one embodiment of the present disclosure.

For example, as shown in FIG. 3B, the touch display system 10 includes a camera N1 and a camera N2. The camera N1 and the camera N2 have the same height relative to the bottom edge of the touch display panel 120 and are respectively arranged (for example, integrally arranged or separately arranged) on both sides of the touch display panel 120. For example, in the case where a user stands in front of the touch display panel 120 and is located between the camera N1 and the camera N2, the camera N1 and the camera N2 simultaneously acquire user image information of the user in front of the touch display panel 120 of the touch display system 10 respectively. The horizontal distance d between the user in front of the touch display panel 120 and the touch display panel 120 is calculated and obtained by using, for example, a triangulation method based on the user image information simultaneously captured by the camera N1 and the camera N2.

Figure 5:
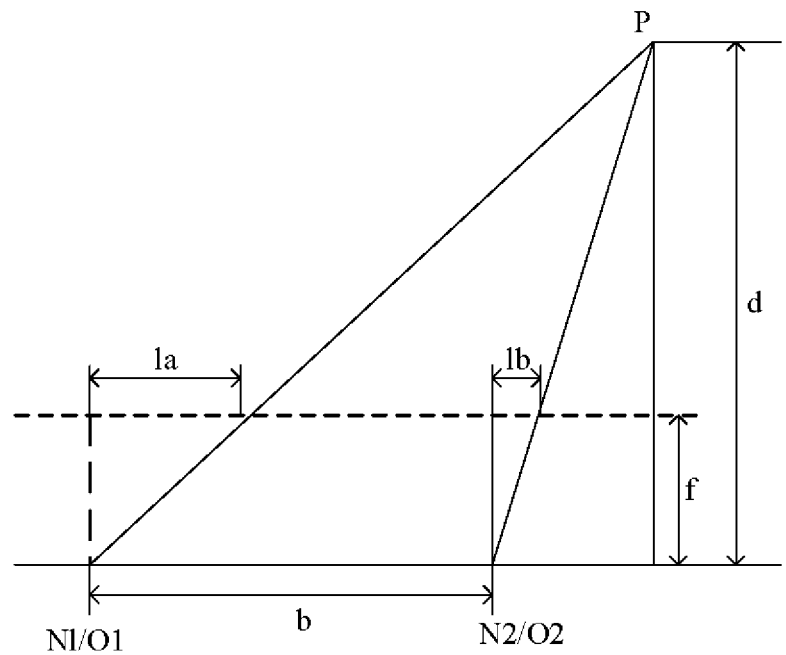
FIG. 5 is a schematic diagram for calculating the horizontal distance between a user and a touch display panel according to at least one embodiment of the present disclosure.

As shown in FIG. 5, the horizontal distance between the camera N1 and the camera N2 is measured as b. The focal lengths of the camera N1 and the camera N2 are both f O1 and O2 are the optical centers of camera N1 and camera N2, respectively. 1a and 1b are the image parallax of the head top P at the camera N1 and the camera N2. For any head top P, 1a-1b is a fixed value. According to the triangulation method, the horizontal distance d between the user and the touch display panel 120 can be calculated according to the following formula.

$$d = \frac{bf}{l_a - l_b} \quad (2)$$

After the horizontal distance d is obtained, the height Hp of the head top P of the user relative to the ground can be obtained by using the calculation method of formula (1). On the basis of the same calculation method as above, the height Hs of the shoulder S of the user relative to the ground (that is, the ground where the touch display panel 120 is located), the height He of the elbow E of the user relative to the ground, and the height Hw of the wrist W of the user relative to the ground can be obtained. The height difference between the head top of the user and the elbow of the user is: $H_p - H_e$. The height difference between the shoulder of the user and the wrist of the user is: $H_s - H_w$.

For example, in other examples, the height Hp of the head top P of the user relative to the ground (that is, the height of the user) may also be directly obtained by inputting the information into a text box by the user. For example, in the case where the user uses the touch display panel for writing and other operations, one or more text boxes are displayed on the touch display panel, and the user inputs his/her height Hp by selecting numerical values or directly inputting numerical values for use in subsequent calculations.

For example, in some embodiments, as shown in FIG. 3A and FIG. 3B, the controller 130 is configured to adjust the touch range for the touch operation of the user in the touch area 121, which includes: acquiring the touch range for the user in the touch area 121 based on the relative height of at least one of the head top P, shoulder S, elbow E, and wrist W of the user relative to the ground where the touch display panel 120 is located. The controller 130 adjusts the touch range for the user in the touch area 121, so that the adjusted touch range can meet the user's touch demand, such as being suitable for the upper and lower range or the left and right range when a person stands.

For example, in some embodiments, as shown in FIG. 3A and FIG. 3B, the controller 130 is configured to adjust the touch range for the user in the touch area 121 according to the physical sign information of the user relative to the touch area 121. For example, the detailed process of adjusting the touch range is as follows.

For example, the relative heights of the head top P, shoulders S, elbows E, and wrists W of the user's position in front of the display side of the display panel 120 relative to the ground where the touch display panel 120 is located are obtained. For example, the relative height Hp of the head top P of the user in front of the display side of the touch display panel 120 of the touch display system 10 relative to the ground where the touch display panel 120 is located is obtained.

According to the relative height Hp of the head top P, the position at the touch display panel 120 with the same height as the ground where the touch display panel 120 is located is determined, and this position is set as the display position corresponding to the head top P. For example, by using an image recognition method, the projection coordinate P(X, Y) of the head top P of the user at the touch display panel 121 is obtained, and the projection coordinate P(X, Y) is set as the display position corresponding to the head top P.

The difference between the relative heights of the shoulder S and wrist E of the user is taken as a first length L1, for example, the first length L1 is: $H_s-H_w$. The difference between the relative heights of the head top P and elbow E of the user is taken as a second length L2, for example, the second length L2 is: $H_p-H_e$.

The display position corresponding to the head top P is set as the adjusted touch starting point coordinate, for example, the touch starting point coordinate is the projection coordinate P(X, Y), and the touch range of the user is determined by the first length L1, the second length L2, and the touch starting point coordinate. The touch range of the user is a rectangular range with a first length L1 as one side length and a second length L2 as the adjacent other side length, and the touch starting point coordinate, i.e., projection coordinate P(X,Y), is the upper vertex of the rectangular range.

For example, as shown in FIG. 3A and FIG. 3B, the touch range is located within the touch area 121. The touch range is rectangular. One side (e.g., the long side) of the rectangular range is parallel to the ground and has the first length L1, and the other side is perpendicular to the ground and has the second length L2. The upper vertex of the rectangular range is the projection coordinate P(X, Y) of the head top P of the user on the touch display system 10. The touch range can be determined as a rectangular area with the projection coordinate P(X, Y) of the head top P of the user on the touch display system 10 as the starting point (for example, the vertex of the upper left corner of the rectangle or the vertex of the upper right corner of the rectangle) and L1×L2 as the range.

For example, in the above example, the touch range is an area of other shapes, such as parallelogram, polygon, etc. The projection coordinate P(X, Y) of the head top P on the touch display system 10 is the vertex of the upper left corner or the vertex of the upper right corner.

For example, in other embodiments, the touch display system 10 further includes at least one light emitter and at least one light receiver disposed around the touch display panel 120. The at least one light emitter and the at least one light receiver are respectively coupled to the controller 130.

For example, the touch display system 10 includes a plurality of light emitters and a plurality of light receivers, which are uniformly arranged around the periphery of the touch display panel 120. The position of each light emitter and the position of each light receiver are fixed, and the above position information is sent to the controller 130. The light receiver is configured to receive non-visible light, such as infrared light. The light emitter is configured to emit non-visible light, such as infrared light. The light emitters and the light receivers are in one-to-one correspondence. For example, light emitted by the light emitter at one position is received by the corresponding light receiver. If the light emitted by a certain light emitter is blocked, the corresponding light receiver will not receive the light. The controller 130 is configured to acquire the light information of the light receiver, for example, whether the light receiver receives light. The controller 130 determines the light emitters corresponding to the light blocked by the user and the light emitters around the light emitters corresponding to the light blocked by the user according to the light information fed back by the light receiver, and determine the projection position of the physical sign information of the user on the touch display panel 120 according to the light emitters corresponding to the light blocked by the user and the light emitters unblocked the light blocked. For example, in the case where the user approaches the touch display panel 120, the user's body will block the light of the light emitters, so that the light receivers cannot receive the light. The light emitters blocked by the user's body can be determined according to the information such as whether the light is received or not fed back by the light receivers. According to the positions of the light emitters blocked by the user's body and the positions of the unblocked light emitters, the physical sign information of the user, such as the projection position of the head top on the touch display panel 120, that is, the projection coordinate P(X, Y) of the head top P of the user on the touch display system 10 can be determined. The controller 130 may determine a touch range for the user's touch operation in the touch area 121 according to the projected position of the user's head on the touch display panel 120.

For example, in some embodiments, after determining the adjusted touch range, the controller 130 is further configured to adjust the display mode of the content to be displayed corresponding to the touch operation within the touch range, according to the position of the touch operation within the touch range, in the case where the user performs the touch operation within the adjusted touch range. For example, in the case where the user performs writing operation, the touch range can be displayed in different ways according to the length and format of the written content, for example, new line display and center display, so as to provide a display method which is more convenient for the user to perform writing operation within the touch range.

For example, in some embodiments, the controller 130 is further configured to display the written content in a new line, if the written content in the touch range is located at the boundary of the touch range in the case where the user performs the writing operation within the adjusted touch range. For example, in the case where the user is writing, and the writing content of one line is displayed at the boundary of the touch range, for example, writing from the left side of the touch range and writing to the right side of the touch range, the writing content is changed to the next line or the previous line for display, so that the user can write at a suitable height.

For example, in some examples, the user can use tools such as a stylus pen to perform operations such as writing within the touch range of the touch display panel 120. In the case where the user writes, in order to prevent the viewer's viewing of the display panel from being affected, the border color of the touch range can be set to a color close to the background color of the touch display panel 120. For example, a selection function of setting a font size, which is the font size of the font finally displayed on the touch display panel 120, may also be provided within the touch range. For example, after the user finishes writing, the written information of the user within the touch range can be displayed on the touch display panel 120. For example, the font size selected by the touch display panel 120 and the ratio of the actual written information can be used to scale the written information to the font to be displayed. For example, the enlarged written information is displayed from the upper left corner of the touch display panel.

For example, in some embodiments, the controller 130 is further configured to acquire the commonly-used hand information of the user. If the user's commonly-used hand information is right handed, the touch starting point coordinate is the upper left vertex of the rectangular range, and if the user's commonly-used hand information is left handed, the touch starting point coordinate is the upper right vertex of the rectangular range. For example, as shown in FIG. 3A and FIG. 3B, the touch display panel 120 presents a touch range with a touch function in front of the user, that is, a writing area. The starting point of writing within this writing area is the projection coordinate P(X, Y) of the head top P on the touch display panel 121. In the case where the commonly-used hand is right handed, the writing area (i.e., the touch area) is a rectangular area with P(X, Y) as the starting top of the upper left corner and L1×L2 as the range. In the case where the commonly-used hand is the left handed, the writing area (i.e., the touch area) is a rectangular area with P(X, Y) as the starting top of the upper right corner and L1×L2 as the range.

For example, in some embodiments, as shown in FIG. 3A and FIG. 3B, the controller 130 is further configured to determine whether the boundary coordinates of the adjusted touch range exceed the touch area 121, and if so, send a reminder message to remind the user to move the body or arm position, and redetermine the rectangular range, so that the touch range of the rectangular range is all within the touch area 121 of the touch display panel 120. For example, in the case where the user writes in the touch range within the touch area 121 and the user always writes in the same direction (e.g., to the left or right), or in the case where the user stands near the boundary of the touch area 121 and the boundary of the touch area (e.g., the boundary on the left or right) exceeds the boundary of the touch area 121, the touch display system 10 reminds the user (through display operations, such as arrows, indication signals, and voice prompts, etc.) that the position of the body or arm needs to move. For example, the user is prompted to move in the direction indicated by the arrow by sending a voice reminder message to the user, such as "Please move to the left or right", or by popping up an indication arrow on the touch area 121. In the case where the user moves the body or arm position, the touch area 121 will also move with the user, so that the starting point of the touch area 121 is always consistent with the head top of the user.

For example, in some embodiments, the controller 130 is further configured to start adjusting the touch range for the user to perform the touch operation in the touch area 121 according to the input instruction for adjusting the touch range called by the user. For example, the controller 130 receives an input instruction from a user within a touch range through the touch display panel 120. For example, text content is written into the touch range by using a stylus pen, or the text content is written into the touch range by voice. The controller 130 further adjusts the touch range according to the input instructions made by the user within the touch range. For example, the controller 130 adjusts the touch range in real time in the case where the user performs the touch operation.

For another example, before using the touch display panel 120, the user selects a touch-range adjustment mode through the touch display panel 120 of the touch display system 10 or other input devices (e.g., remote controller) to start the function of adjusting the touch range of the touch display system 10, so as to set an operation area for performing, for example, writing operations. For example, a button for controlling the adjustment mode of writing operation can be set on the touch display panel 120 or other input devices. Alternatively, a voice command recognition module can be set on the touch display system 10, the writing mode can be entered by voice such as "Start writing mode", and the touch range can be adjusted first to facilitate writing operation. For example, the user can exit the adjustment mode of the writing operation after the writing operation is finished.

For example, in some embodiments, as shown in FIG. 1, the touch display system 10 further includes a storage device 150. The storage device 150 is coupled to the controller 130. The storage device 150 includes a user information base, which includes the identity information of the user and the physical sign information of the user. The identity information includes the user's authentication information, which is the biometric information of the user or the password information for logging into the database. For example, the user physical sign information in the user information base includes the height Hp of the head top P of the user relative to the ground, the height Hs of the shoulder S of the user relative to the ground, the height He of the elbow E of the user relative to the ground, and the height Hw of the wrist W of the user relative to the ground. The height difference between the head top of the user and the elbow of the user is: $H_p - H_e$. The height difference between the shoulder of the user and the wrist of the user is: $H_s - H_w$. The authentication information or password information for logging into the database is, for example, a human face image, fingerprint information of at least one finger of the user, or an identification number.

For example, in some embodiments, the controller 130 is further configured to acquire the identity information of the user and the physical sign information corresponding to the identity information of the user before acquiring the pre-stored physical sign information.

For example, after determining the touch range of the user, the physical sign information of the user is stored in the user information base in combination with the identity information of the user. The physical sign information of the user can be obtained from the user information base afterwards through the identity information of the user. For example, the physical sign information of the user and identity information may be pre-stored in the user information base before the user writes using the touch display system 10. In the case where the user uses the touch display system 10 for the second time, the touch display system 10 only needs to measure the horizontal distance between the user and the touch display panel 120, and call the physical sign information pre-stored in the user information base through the identity information of the user, so that the touch range of the user can be obtained and the time required for measurement and calculation can be saved.

For example, the storage device 150 storing the user information base may be a semiconductor memory, a magnetic medium memory, or the like. For example, the user information base runs in a touch display system or a web server. The touch display system can access the user information base by accessing the web server.

According to needs, the touch display system 10 may further include, for example, a communication device, a speaker, a microphone, etc. The communication device communicates with a network server or other peripheral devices (such as a remote controller); sounds are emitted through the speaker and sound signals are collected through the microphone. The communication device is, for example, a wired communication device or a wireless communication device.

Figure 2:
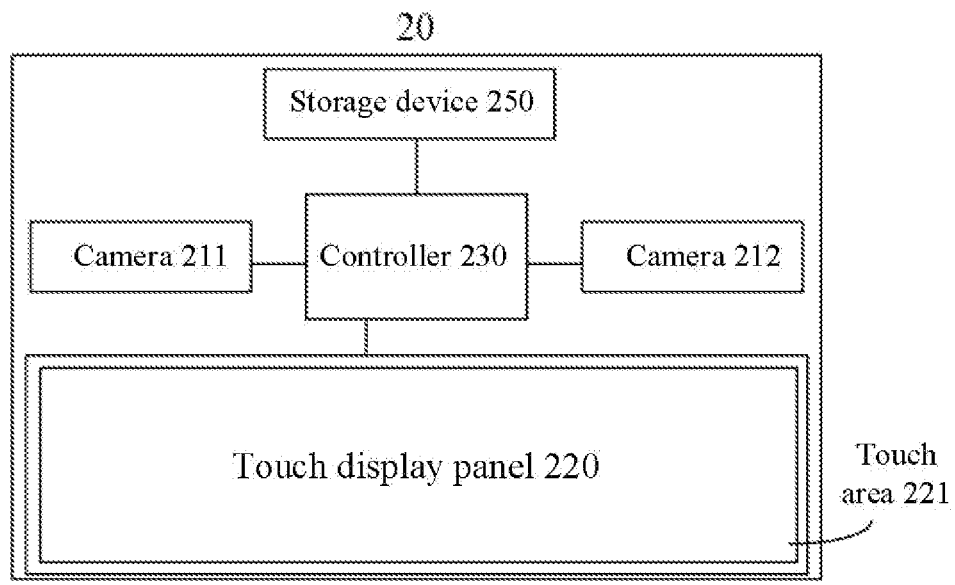
FIG. 2 is a schematic block diagram of a touch display system according to at least one embodiment of the present disclosure.

At least one embodiment of the present disclosure further provides a touch display system. FIG. 2 is a schematic block diagram of a touch display system according to at least one embodiment of the present disclosure.

For example, as shown in FIG. 2, the touch display system 20 includes at least two cameras, a controller 230, and a touch display panel 220. The touch display panel 220 includes a touch area 221, and is configured to sense the touch operation of the user. For example, the size of the touch area 221 is 55 inches, 65 inches, 75 inches, 85 inches or 98 inches. The controller 230 is configured to acquire the physical sign information of a user who is to operate the touch display panel 220, and adjust the touch range for the user to perform touch operation in the touch area 221 according to the physical sign information of the user. For example, the physical sign information of the user on the touch display panel 220 may be pre-stored physical sign information of the user, such as height of body, shoulders, elbows, etc., and may also be real-time physical sign information of the user acquired by the controller 230 in the case where the user stands in front of the touch display panel 220.

It should be noted that the touch display panel 220 can be the in-cell or on-cell display panel with touch and display functions, and the touch area is an area with touch and display functions. In-cell touch display panel, for example, by means of circuit sharing, embeds the circuit for realizing touch function in the display area of the display panel to realize dual functions of touch and display. The on-cell touch display panel has a circuit for realizing the touch function, for example, by gluing, etc., stacked on the outside of the display panel with the display function, so as to realize the dual functions of touch and display. In this way, the user can perform touch operation for the touch area, and the prompt for the touch operation or the result of the touch operation can be directly displayed in the touch area.

For example, the touch display system 20 is an upright touch screen, which is fixed on a bracket or hung on a vertical wall. The user can stand in front of the touch display system 20 and perform touch operation with his/her hand or stylus pen.

For example, in some examples, the touch range may be the whole touch area or a part of the touch area. The user can operate the touch display system 20 within the touch range, including writing characters, pictures, etc., and operations during calling out or exiting applications or functions such as sliding, clicking, and long pressing, thereby realizing interaction, etc. Because the position of these operations on the touch display panel (too high or too far away from the user) may bring inconvenience to the user (limitation of lift, arm length, etc.), it is necessary to adjust the touch range. For example, the touch area of the touch display panel 120 may cover the entire touch display panel 120.

For example, in some embodiments, adjusting the touch range in the touch area 221 for the user has different schemes in different scenes. For example, the adjusted touch range can be all of the touch area 211, or part of the touch area 221 of the touch display panel 220, so that the user can conveniently operate the touch display system 20 within the touch range. For another example, adjusting the touch range specifically refers to adjusting the touch range of some application windows, adjusting the touch range of the display desktop, or adjusting the touch range of documents. Adjusting the touch range may be to superimpose a new window on the original touch screen, so that the window serves as the adjusted touch range of the user.

For example, the touch display panel 220 directly or indirectly transmits the sensed touch information to the controller 230, and the controller 230 determines what operation to perform through the acquired touch information according to the currently running application program. For example, the written information of the user within the touch range can be collected and identified, and can be further displayed on the matched touch display panel 220. For example, the touch display panel 220 captures written information within the touch range. For example, the controller 230 scales the written information to the font to be displayed according to the font size selected by the user and the ratio of the actual written information. For example, the enlarged written information is displayed from the upper left corner of the touch display panel 220.

For example, the touch display panel 220 may be a liquid crystal display panel with touch and display functions, an organic light-emitting diode display panel, an inorganic light-emitting diode display panel, and the like. The modules (or circuits) for realizing the touch function can be resistive, capacitive, infrared, surface acoustic wave, etc., and are integrated into the display area of the display panel by in-cell or on-cell manner to realize the touch and display functions. The embodiments of the present disclosure do not limit the type of the display panel.

According to the touch display system provided in the above embodiments of the present disclosure, by acquiring the physical sign information of the user who is to operate the touch display panel 220 and adjusting the touch range in the touch area 221 according to the physical sign information of the user, users with different physical sign information (e.g., users with different heights and arm lengths) can conveniently operate the touch display system, thus being suitable for large-sized touch devices.

For example, as shown in FIG. 2, the controller 230 is connected with the touch display panel 220. At least two cameras, including camera 211 and camera 212, are respectively connected with the controller 230. The relative heights of the camera 211 and the camera 212 are consistent and are respectively arranged at both sides of the touch display panel 220. The camera 211 and the camera 212 respectively acquire user image information of the user in front of the touch display panel 220 of the touch display system. The horizontal distance between the user in front of the touch display panel 220 and the touch display panel 220 is calculated through the images simultaneously captured by the camera 211 and the camera 212 respectively. The calculation principle of horizontal distance is the same as that of horizontal distance d shown in FIG. 5. In FIG. 5, the horizontal distance d between the user in front of the touch display panel 120 and the touch display panel 120 is calculated and obtained by using, for example, a triangulation method based on the user image information simultaneously captured by the camera N1 and the camera N2.

For example, the camera 211 and the camera 212 may be provided integrally with the touch display panel 220 or may be separately from touch display panel 220. For another example, the camera 211 and the camera 212 may be separately or integrally arranged at both sides of the touch display panel 220 and have the same height. The present disclosure is not limited by the arrangement mode or position of the camera 211 and the camera 212.

According to the user image information, the height Hp of the head top of the user relative to the ground, the height Hs of the shoulder S of the user relative to the ground, the height He of the elbow E of the user relative to the ground, and the height Hw of the wrist W of the user relative to the ground, are obtained by an image recognition method. The height difference between the head top of the user and the elbow of the user is: $H_p-H_e$. The height difference between the shoulder of the user and the wrist of the user is: $H_s-H_w$. The difference between the relative heights of the shoulder S and wrist W of the user is taken as a first length L1. The difference between the relative heights of the head top P and elbow E of the user is taken as a second length L2. For example, as shown in FIG. 3A and FIG. 3B, the first length L1 is $H_s-H_w$, and the second length L2 is $H_p-H_e$.

For example, in other examples, the height Hp of the head top P of the user relative to the ground (that is, the height of the user) can also be directly obtained by allowing the user to input in a text box. For example, in the case where the user uses the touch display panel for writing and other operations, one or more text boxes are displayed on the touch display panel, and the user can input his/her height Hp by selecting numerical values or directly inputting numerical values for use in subsequent calculations.

For example, the camera can include CCD (Charged Coupled Device) image sensor, CMOS (Complementary Metal-Oxide-Semiconductor) image sensor, and other image acquisition devices for surrounding environment. Embodiments of the present disclosure do not limit the structure (e.g., image sensor, lens, etc.) and specifications (e.g., resolution, etc.) of the camera.

For example, the controller 230 may be a central processing unit (CPU), a digital signal processor (DSP), a programmable logic controller (PLC), etc., which is not limited by embodiments of the present disclosure. For example, the controller 230 is configured to adjust the touch range for the user in the touch area 221 according to the physical sign information of the user relative to the touch area 221. The detailed process of adjusting the touch range is as follows.

For example, the relative heights of the head top P, shoulders S, elbows E, and wrists W of the user's position in front of the display side of the display panel 120 relative to the ground where the touch display panel 220 is located are obtained. For example, obtain the relative height Hp of the head top P of the user in front of the side of the touch display panel 220 of the touch display system 20 relative to the ground where the touch display panel 220 is located is obtained.

According to the relative height Hp of the head top P, the position at the touch display panel 220 with the same height as the ground where the touch display panel 220 is located is determined, and this position is set as the display position corresponding to the head top P. For example, by using an image recognition method, the projection coordinate P(X, Y) of the head top P of the user at the touch display panel 121 is obtained, and the projection coordinate P(X, Y) is set as the display position corresponding to the head top P.

The difference between the relative heights of the shoulder S and wrist W of the user is taken as the first length L1, for example, the first length L1 is $H_s-H_w$. The difference between the relative heights of the head top P and elbow E of the user is taken as the second length L2, for example, the second length L2 is $H_p-H_e$.

The display position corresponding to the head top P is set as the adjusted touch starting point coordinate, for example, the touch starting point coordinate is the projection coordinate P(X, Y), and the touch range of the user is determined by the first length L1, the second length L2, and the touch starting point coordinate. The touch range of the user is a rectangular range with the first length L1 as one side length and the second length L2 as the adjacent other side length, and the touch starting point coordinate, i.e., projection coordinate P(X, Y), is the upper vertex of the rectangular range.

For example, in some examples, the touch range is located within the touch area 221. The touch range is rectangular. One side (e.g., the long side) of the rectangular range is parallel to the ground with the first length L1, and the other side is perpendicular to the ground with the second length L2. The upper vertex of the rectangular range is the projection coordinate P(X, Y) of the head top P of the user on the touch display system 20. The touch range can be determined as a rectangular area with the projection coordinate P(X, Y) of the head top P of the user on the touch display system 20 as the starting point (for example, the vertex of the upper left corner of the rectangle or the vertex of the upper right corner of the rectangle) and L1×L2 as the range.

For example, in the above example, the touch range can also be an area of other shapes, such as parallelogram, polygon, etc. The projection coordinate P(X, Y) of the head top P on the touch display system 20 is the vertex of the upper left corner or the vertex of the upper right corner.

For example, in other embodiments, the touch display system 20 may further include at least one light emitter and at least one light receiver disposed around the touch display panel 220. The at least one light emitter and the at least one light receiver are respectively coupled to the controller 230. For example, the touch display system 20 includes a plurality of light emitters and a plurality of light receivers, which are uniformly arranged around the periphery of the touch display panel 220. The position of each optical light emitter and the position of each light receiver are fixed, and the above position information is sent to the controller 230. The light receiver is configured to receive non-visible light, such as infrared light. The light emitter is configured to emit non-visible light, such as infrared light. The light emitters and the light receivers are in one-to-one correspondence. For example, light emitted by a light emitter at one position is received by the corresponding light receiver. If the light emitted by a certain light emitter is blocked, the corresponding light receiver will not receive the light. The controller 230 is configured to acquire the light information of the light receiver, for example, whether the light receiver receives light. The controller 230 can determine a first light emitter corresponding to the light blocked by the user and a second light emitte which is located around the first light emitter and corresponds to the light unblocked by the user according to the light information fed back by the light receiver, and determine the projection position of the physical sign information of the user on the touch display panel 220 according to the first and second light emitters. For example, in the case where the user approaches the touch display panel 220, the user's body will block the light of the light emitters, so that the light receivers cannot receive the light. The light emitters blocked by the user's body can be determined according to the information such as whether the light is received or not fed back by the light receivers. According to the positions of the light emitters blocked by the user's body and the positions of the unblocked light emitters, the physical sign information of the user, such as the projection position of the head top on the touch display panel 220, that is, the projection coordinate P (X, Y) of the head top P of the user on the touch display system 20 can be determined. The controller 230 may determine a touch range for the user's touch operation in the touch area according to the projected position of the user's head on the touch display panel 220.

For example, in some embodiments, after determining the adjusted touch range, the controller 230 is further configured to adjust the display mode of the content to be displayed corresponding to the touch operation within the touch range, according to the position of the touch operation within the touch range in the case where the user performs the touch operation within the adjusted touch range. For example, in the case where the user performs writing operation, the touch range can be displayed in different ways according to the length and format of the written content, for example, new line display and center display, so as to provide a display method which is more convenient for the user to perform writing operation within the touch range.

For example, in some embodiments, the controller 230 is further configured to display the written content in a new line, if the written content in the touch range is located at the boundary of the touch range in the case where the user performs the writing operation within the adjusted touch range. For example, in the case where the user is writing, and the writing content of one line is displayed at the boundary of the touch range, for example, writing from the left side of the touch range and writing to the right side of the touch range, the writing content is changed to the next line or the previous line for display, so that the user can write at a suitable height.

For example, in some examples, the user can use tools such as a stylus pen to perform operations such as writing within the touch range of the touch display panel 220. In the case where the user writes, in order to prevent the viewer's viewing of the display panel from being affected, the border color of the touch range can be set to a color close to the background color of the touch display panel 220. For example, a selection function of setting a font size, which is the font size of the font finally displayed on the touch display panel 220, may also be provided within the touch range. For example, after the user finishes writing, the written information of the user within the touch range can be displayed on the touch display panel 220. For example, the font size selected by the touch display panel 220 and the ratio of the actual written information can be used to scale the written information to the font to be displayed. For example, the enlarged written information is displayed from the upper left corner of the touch display panel.

For example, in some embodiments, the controller 230 is further configured to acquire the commonly-used hand information of the user. If the user's commonly-used hand information is right handed, the touch starting point coordinate is the upper left vertex of the rectangular range, and if the user's commonly-used hand information is left handed, the touch starting point coordinate is the upper right vertex of the rectangular range. For example, as shown in FIG. 3A and FIG. 3B, the touch starting point coordinates is the projection coordinate P(X, Y). In the case where the commonly-used hand is right handed, the writing area (i.e., the touch area) is a rectangular area with P(X, Y) as the starting top of the upper left corner and L1×L2 as the range. In the case where the commonly-used hand is left handed, the writing area (i.e., the touch area) is a rectangular area with P(X, Y) as the starting top of the upper right corner and L1×L2 as the range.

For example, in some embodiments, the controller 230 is further configured to determine whether the boundary coordinates of the adjusted touch range exceed the touch area 221, and if so, send a reminder message to remind the user to move the body or arm position, and re-determine the rectangular range, so that the touch range of the rectangular range is all within the touch area 221 of the touch display panel 220. For example, in the case where the user writes in the touch range within the touch area 221 and the user always writes in the same direction (e.g., to the left or right) or in the case where the user stands near the boundary of the touch area 221 and the boundary of the touch area (e.g., the boundary on the left or right) exceeds the boundary of the touch area 221, the touch display system 20 reminds the user (through display operations, such as arrows, indication signals, and voice prompts, etc.) that the position of the body or arm needs to move. For example, the user is prompted to move in the direction indicated by the arrow by sending a voice reminder message to the user, such as "Please move to the left or right", or by popping up an indication arrow on the touch area 221. In the case where the user moves the body or arm position, the touch area 221 will also move with the user, so that the starting point of the touch area 221 is always consistent with the head top of the user.

For example, in some embodiments, as shown in FIG. 2, the controller 230 is further configured to start adjusting the touch range for the user to perform the touch operation in the touch area 221 according to the input instruction for adjusting the touch range called by the user. For example, the controller 230 receives an input instruction from a user within a touch range through the touch display panel 220. For example, text content is written into the touch range by using a stylus pen, or the text content is written into the touch range by voice. The controller 230 further adjusts the touch range according to the input instructions made by the user within the touch range. For example, the controller 230 adjusts the touch range in real time in the case where the user performs the touch operation.

For example, in some examples, the touch display system 20 further includes a storage device 250. The storage device 250 is coupled to the controller 230. The storage device 250 includes a user information base, which includes the identity information of the user and the physical sign information of the user. The identity information includes the user's authentication information, which is the biometric information of the user or the password information for logging into the database. For example, the user physical sign information in the user information base includes the height Hp of the head top P of the user relative to the ground, the height Hs of the shoulder S of the user relative to the ground, the height He of the elbow E of the user relative to the ground, and the height Hw of the wrist W of the user relative to the ground. The height difference between the head top of the user and the elbow of the user is: $H_p - H_e$. The height difference between the shoulder of the user and the wrist of the user is: $H_s - H_w$. The authentication information or password information for logging into the database is, for example, a human face image, fingerprint information of at least one finger of the user, or an identification number.

For example, in some embodiments, the controller 230 is further configured to acquire the identity information of the user and the physical sign information corresponding to the identity information of the user before acquiring the pre-stored physical sign information.

For example, after determining the touch range of the user, the physical sign information of the user is stored in the user information base in combination with the identity information of the user. The physical sign information of the user can be obtained from the user information base afterwards through the identity information of the user. For example, the physical sign information of the user and identity information may be pre-stored in the user information base before the user writes using the touch display system 20. In the case where the user uses the touch display system 20 for the second time, the touch display system 20 only needs to measure the horizontal distance between the user and the touch display panel 220, and call the physical sign information pre-stored in the user information base through the identity information of the user, so that the touch range of the user can be obtained and the time required for measurement and calculation can be saved.

For example, the storage device 250 storing the user information base may be a semiconductor memory, a magnetic medium memory, or the like. For example, the user information base runs in a touch display system or a web server, and the touch display system can access the user information base by accessing the web server.

According to needs, the touch display system 20 may further include, for example, a communication device, a microphone, etc. The communication device communicates with a network server or other peripheral devices (such as a remote controller); and sound signals are collected through the microphone. The communication device is, for example, a wired communication device or a wireless communication device.

It should be noted that, in order to show clearly and concisely, the embodiments of this disclosure do not give all the components of the touch display system. To realize the necessary functions of the touch display system, those skilled in the art can provide and set other unillustrated components according to specific needs, which is not limited by the embodiments of the present disclosure.

Figure 6:
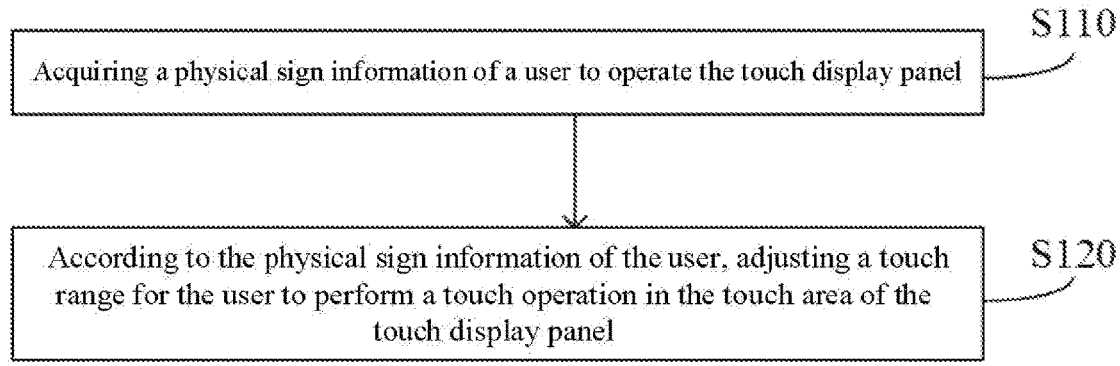
FIG. 6 is a flowchart of a control method of a touch display system according to at least one embodiment of the present disclosure.

At least one embodiment of the present disclosure further provides a control method of a touch display system, and FIG. 6 is a flowchart of a control method of a touch display system provided by at least one embodiment of the present disclosure.

As shown in FIG. 6, the control method is suitable for a touch display system with a touch display panel. The touch display system is, for example, an upright touch screen placed on a bearing device, for example, fixed on a bracket or hung on a wall. Users can stand in front of the touch display system and use their hands or stylus pen to perform touch operations. The structure of the touch display system has been described in detail in the above embodiments, and will not be repeated here. This control method includes the following step S110 to step S120.

Step S110: acquiring a physical sign information of a user to operate the touch display panel.

For example, in some examples, the touch area of the touch display system includes a touch range which can be all or a part of the touch area, and the user can operate the touch display system 10 within the touch range, including writing characters, pictures, etc., and operations during calling out or exiting applications or functions such as sliding, clicking, long pressing, etc., thereby realizing interaction, etc.

In some embodiments, the physical sign information of the user may include the relative height between at least one of the head top, shoulders, elbows, and wrists of the user and the ground where the touch display panel is located.

For example, in some examples, the physical sign information of the user may further include the user's commonly-used hand information, such as left handed or right handed, or a commonly-used finger.

For example, the physical sign information of the user can be obtained at least in part by obtaining the user image information of the user in front of the touch display panel of the touch display system, or by obtaining the pre-stored physical sign information of the user. Some specific examples of step S110 will be described in detail with reference to FIG. 7.

Step S120: according to the physical sign information of the user, adjusting a touch range for the user to perform a touch operation in the touch area of the touch display panel, so that the adjusted touch range can meet the user's touch demand, such as being suitable for the upper and lower ranges or the left and right ranges in the case where a person stands.

Adjusting the touch range for users in the touch area has different schemes in different scenes.

For example, the adjusted touch range can be all of the touch area of the touch display panel or part of the touch area of the touch display panel, so that the user can conveniently operate the touch display system 10 within the touch range. For another example, adjusting the touch range specifically refers to adjusting the touch range of some application windows, adjusting the touch range of the display desktop, or adjusting the touch range of documents. Adjusting the touch range may be to superimpose a new window on the original touch screen, so that the window serves as the adjusted touch range of the user.

Some specific examples of step S120 will be described in detail with reference to FIG. 7.

According to the control method provided by the above embodiments of the present disclosure, by acquiring the physical sign information of the user who is to operate the touch display panel, and adjusting the touch range in the touch area for the user according to the physical sign information of the user, users with different physical sign information (e.g., users with different heights and arm lengths) can conveniently operate the touch display system, thus being suitable for large-sized touch devices.

Figure 7:
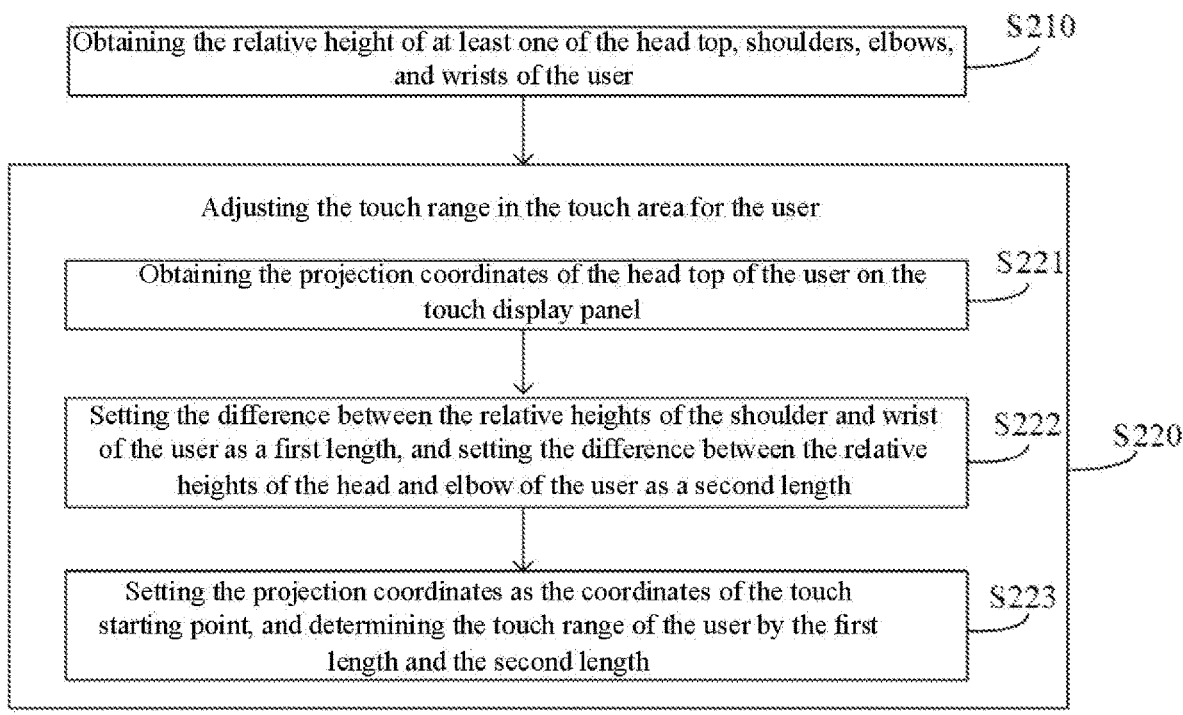
FIG. 7 is a flowchart of a control method of a touch display system according to at least one embodiment of the present disclosure.

FIG. 7 is a flowchart of a control method for a touch display system according to another embodiment of the present disclosure. Similarly, the control method is applicable to a touch display system including a touch display panel. The touch display system is, for example, an upright touch screen, which is fixed on a bracket or hung on a vertical wall. Users can stand in front of the touch display system and use their hands or stylus pen to perform touch operations. The embodiment shown in FIG. 7 includes step S210 to step S220.

Step S210: obtaining the relative height of at least one of the head top, shoulders, elbows, and wrists of the user.

For example, in some embodiments, obtaining the relative height of at least one of the head top, shoulders, elbows, and wrists of the user includes: obtaining user image information of the user in front of a touch display panel of a touch display system, and obtaining the relative height of at least one of the head top, shoulders, elbows, and wrists of the user according to the image information of the user.

As shown in FIG. 3A and FIG. 4, in this example, the user stands in front of the vertically placed touch display system 10, with the front or back facing the touch display panel of the touch display system, and the front or back of the user is parallel to the touch display panel. The plane on which the user stands is taken as the ground, and both the user's body and arms are perpendicular to the ground. For example, the touch display system 10 may include a touch area 121. For example, the touch display system 10 acquires the user image information of the user in front of the touch display panel of the touch display system 10 through at least one camera, and determines the positions of the head top P, shoulder S, elbow E, and wrist W of the user from the user image information by using an image recognition method. For example, the touch display system 10 includes a camera N, and the camera N can be located at the center of the top of the touch display system 10, that is, at point N in FIG. 3A, which is higher than the of the head top P of the user.

The relative height of at least one of the head top, shoulders, elbows, and wrists obtained by the embodiments of the present disclosure has no relationship with the orientation of the body in the length direction (direction parallel to the ground) relative to the touch display panel of the touch display system in the case where the user stands upright, and the embodiments of the present disclosure are not limited thereto.

For example, in some examples, obtaining the relative height of at least one of the head top, shoulders, elbows, and wrists of the user according to the user image information includes: obtaining the horizontal distance between the user in front of the touch display panel and the touch display panel, and obtaining the relative height of at least one of the head top, shoulders, elbows, and wrists of the user according to the horizontal distance and the user image information.

For example, in some examples, the touch display system includes at least one camera and a distance measuring device, wherein the user image information of the user in front of the touch display panel of the touch display system is acquired through the at least one camera, and the horizontal distance between the user and the touch display panel is acquired through the distance measuring device.

According to the horizontal distance and user image information, the relative heights of at least one of the head top, shoulders, elbows, and wrists of the user, that is, the height Hp of the head top of the user relative to the ground, the height Hs of the shoulder S of the user relative to the ground, the height He of the elbow E of the user relative to the ground, and the height Hw of the elbow W of the user relative to the ground are obtained. The image recognition method is used to determine the head top P of the user according to the user image information acquired by the camera, the included angle M of the head top P relative to the camera N on the touch display system is calculated, and the height Hp of the head top of the user relative to the ground is obtained according to the above formula (1). With the same calculation method as the above head top P, the height Hs of the shoulder S of the user relative to the ground is obtained. The height He of the elbow E of the user relative to the ground is located is obtained. The height Hw of the wrist W relative to the ground is located is obtained is obtained. The height difference between the head top of the user and the elbow of the user is: $H_p-H_e$. The height difference between the shoulder of the user and the wrist of the user is: $H_s-H_w$.

For example, in some embodiments, the touch display system includes at least two cameras which are arranged separately, and obtaining the horizontal distance between the user in front of the touch display panel and the touch display panel includes: calculating and obtaining the horizontal distance between the user in front of the touch display panel and the touch display panel through the user image information respectively and simultaneously captured by the at least two cameras. Please note that "simultaneously capturing" here also includes "basically simultaneously capturing", that is, the capturing time of two cameras is allowed to be slightly different, as long as it does not hinder the subsequent calculation.

For example, as shown in FIG. 3B, the touch display system 10 includes a camera N1 and a camera N2. The camera N1 and the camera N2 have the same height relative to the bottom edge of the touch display panel 120 and are respectively arranged (for example, integrally arranged or separately arranged) on both sides of the touch display panel 120. For example, in the case where a user stands in front of the touch display panel 120 and is located between the camera N1 and the camera N2, the camera N1 and the camera N2 simultaneously acquire user image information of the user in front of the touch display panel 120 of the touch display system 10 respectively. The horizontal distance d between the user in front of the touch display panel 120 and the touch display panel 120 is calculated and obtained by using formula (2) and, for example, a triangulation method based on the user image information simultaneously captured by the camera N1 and the camera N2. The calculation principle of the calculation method of the horizontal distance d is shown in FIG. 4, which has been described in detail in the above description of the touch display system 10, and will not be described in detail here. After the horizontal distance d is obtained, the height Hp of the head top P of the user relative to the ground can be obtained by using the calculation method of formula (1). On the basis of the same calculation method as above, the height Hs of the shoulder S of the user relative to the ground (that is, the ground where the touch display panel 120 is located), the height He of the elbow E of the user relative to the ground, and the height Hw of the wrist W of the user relative to the ground can be obtained. The height difference between the head top of the user and the elbow of the user is: $H_p-H_e$. The height difference between the shoulder of the user and the wrist of the user is: $H_s-H_w$.

For example, in other examples, the height Hp of the head top P of the user relative to the ground (that is, the height of the user) can also be directly obtained by allowing the user to input in a text box. For example, in the case where the user uses the touch display panel for writing and other operations, one or more text boxes are displayed on the touch display panel, and the user can input his/her height Hp by selecting numerical values or directly inputting numerical values for use in subsequent calculations.

Step S220: adjusting the touch range in the touch area for the user. For example, based on the relative heights of the head top P, shoulder S, elbow E, and wrist W of the user, the touch range for the user in the touch area is acquired.

For example, in some examples, as shown in FIG. 7, step S220 includes step S221 to step S223.

Step S221: obtaining the projection coordinates of the head top of the user on the touch display panel. For example, using an image recognition method, the projection coordinates P(X, Y) of the head top P of the user on the touch display panel are obtained.

Step S222: setting the difference between the relative heights of the shoulder and wrist of the user as a first length, and setting the difference between the relative heights of the head and elbow of the user as a second length. As shown in FIG. 3A and FIG. 3B, the first length L1 is $H_p-H_e$, and the second length is $H_s-H_w$.

Step S223: setting the projection coordinates as the coordinates of the touch starting point, and determining the touch range of the user by the first length and the second length.

As shown in FIG. 3A and FIG. 3B, for example, in some examples, the touch range is located within the touch area 121. The touch range is rectangular. One side (e.g., the long side) of the rectangular range is parallel to the ground with the first length L1, and the other side is perpendicular to the ground with the second length L2. The upper vertex of the rectangular range is the projection coordinate P(X, Y) of the head top P of the user on the touch display system 10. The touch range can be determined as a rectangular area with the projection coordinate P(X, Y) of the head top P of the user on the touch display system 10 as the starting point (for example, the vertex of the upper left corner of the rectangle or the vertex of the upper right corner of the rectangle) and L1×L2 as the range.

For example, in the above example, the touch range can also be an area of other shapes, such as parallelogram, polygon, etc. The projection coordinate P(X, Y) of the head top P on the touch display system 10 is the vertex of the upper left corner or the vertex of the upper right corner.

For example, in some examples, before the user writes, the touch display panel presents a writing area in front of the user by displaying a solid-line box or a dashed-line box to prompt the user to operate. The range of the writing area can be the touch range determined in the above embodiments. The starting point of writing is the projection coordinate P(X, Y) of the head top P on the touch display panel, and the rectangular area with P(X, Y) as the starting point and L1×L2 as the range.

For example, in some examples, the user can use tools such as a stylus pen to perform operations such as writing within the touch range of the touch display panel. In the case where the user writes, in order to prevent the viewer's viewing of the display panel from being affected, the border color of the touch range can be set to a color close to the background color of the touch display panel 120. For example, a selection function of setting a font size, which is the font size of the font finally displayed on the touch display panel 120, may also be provided within the touch range. For example, after the user finishes writing, the written information of the user within the touch range can be displayed on the touch display panel. For example, the writing information in the touch range is captured by the touch display panel, and the font size selected by the touch display panel 120 and the ratio of the actual written information can be used to scale the written information to the font to be displayed. For example, the enlarged written information is displayed from the upper left corner of the touch display panel.

For example, in some examples, obtaining the physical sign information of the user further includes: obtaining the commonly-used hand information of the user. If the user's commonly-used hand information is right handed, the touch starting point coordinate is the upper left vertex of the rectangular range, and if the user's commonly-used hand information is left handed, the touch starting point coordinate is the upper right vertex of the rectangular range.

For example, as shown in FIG. 3A and FIG. 3B, the touch display panel presents a touch range with a touch function in front of the user, that is, a writing area. The starting point of writing within this writing area is the projection coordinate P(X, Y) of the head top P on the touch display panel. In the case where the commonly-used hand is right handed, the writing area (i.e., the touch area) is a rectangular area with P(X, Y) as the starting top of the upper left corner and L1×L2 as the range. In the case where the commonly-used hand is the left hand, the writing area (i.e., the touch area) is a rectangular area with P(X, Y) as the starting top of the upper right corner and L1×L2 as the range.

For example, in some examples, the identity information of the user and the physical sign information of the user are stored in the user information base, and the identity information may include a face image or an identification number, etc. For example, the identity information may further include fingerprint information of at least one finger of the user.

For example, after determining the user's touch range, the physical sign information of the user is stored in the user information base in combination with the identity information of the user, and the physical sign information of the user can be obtained from the user information base afterwards through the identity information of the user. For example, the physical sign information of the user and the identity information of the user may be pre-stored in the user information base before the user uses the touch display system to write and other operations. In the case where the user uses the touch display system for the second time, the touch display system only needs to measure the horizontal distance from the touch display panel before the user touches the display panel, and call the physical sign information pre-stored in the user information base through the identity information of the user, so that the touch range of the user can be obtained.

For example, the user information base can run in a touch display system or a web server, and the touch display system can access the user information base by accessing the web server. The information in the user information base can be stored in a memory, which can be a semiconductor memory, a magnetic medium memory, etc.

Figure 8A:
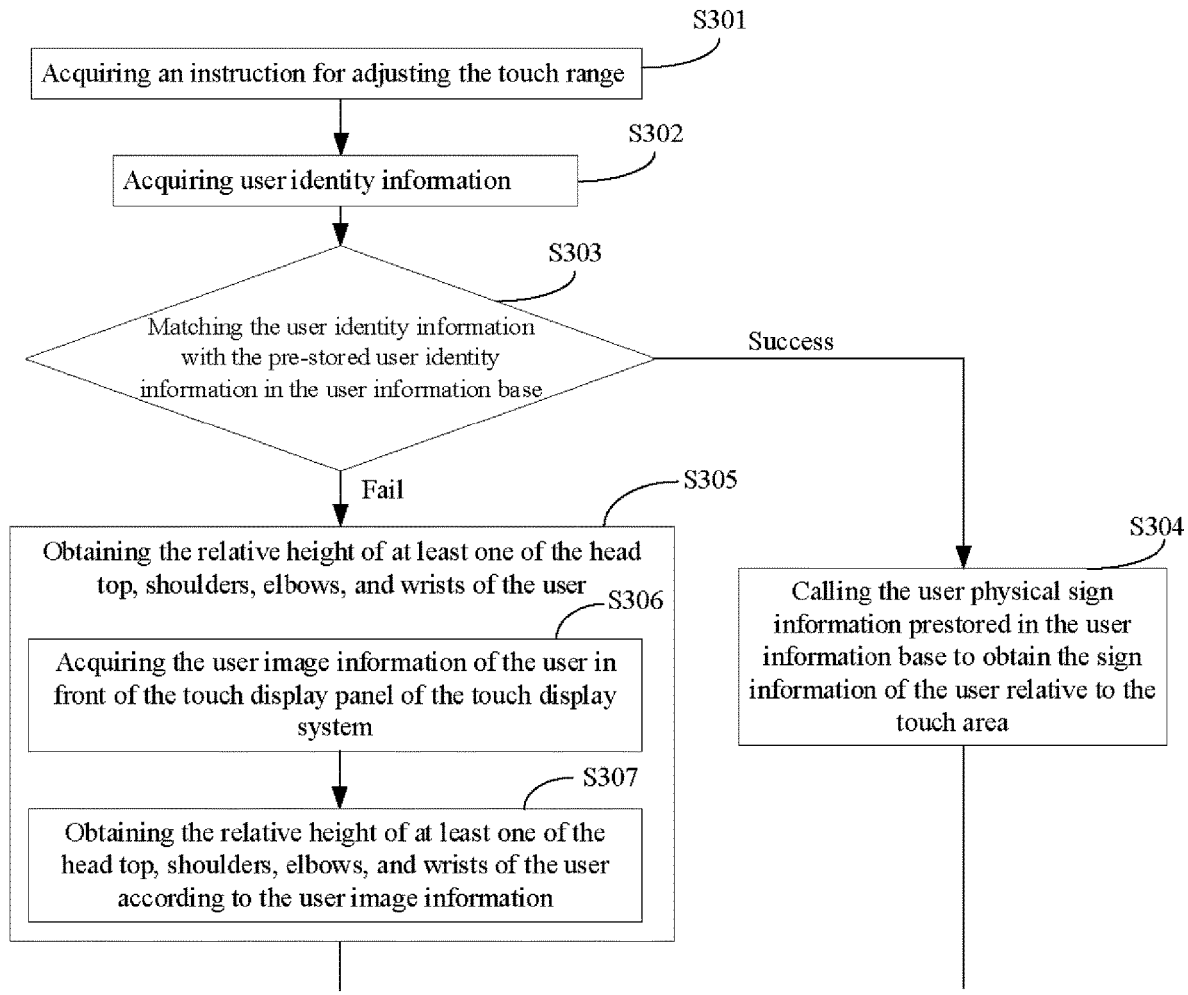
FIGS. 8A and 8B illustrate is a schematic diagram of a control method of a touch display system according to at least one embodiment of the present disclosure.
Figure 8B:
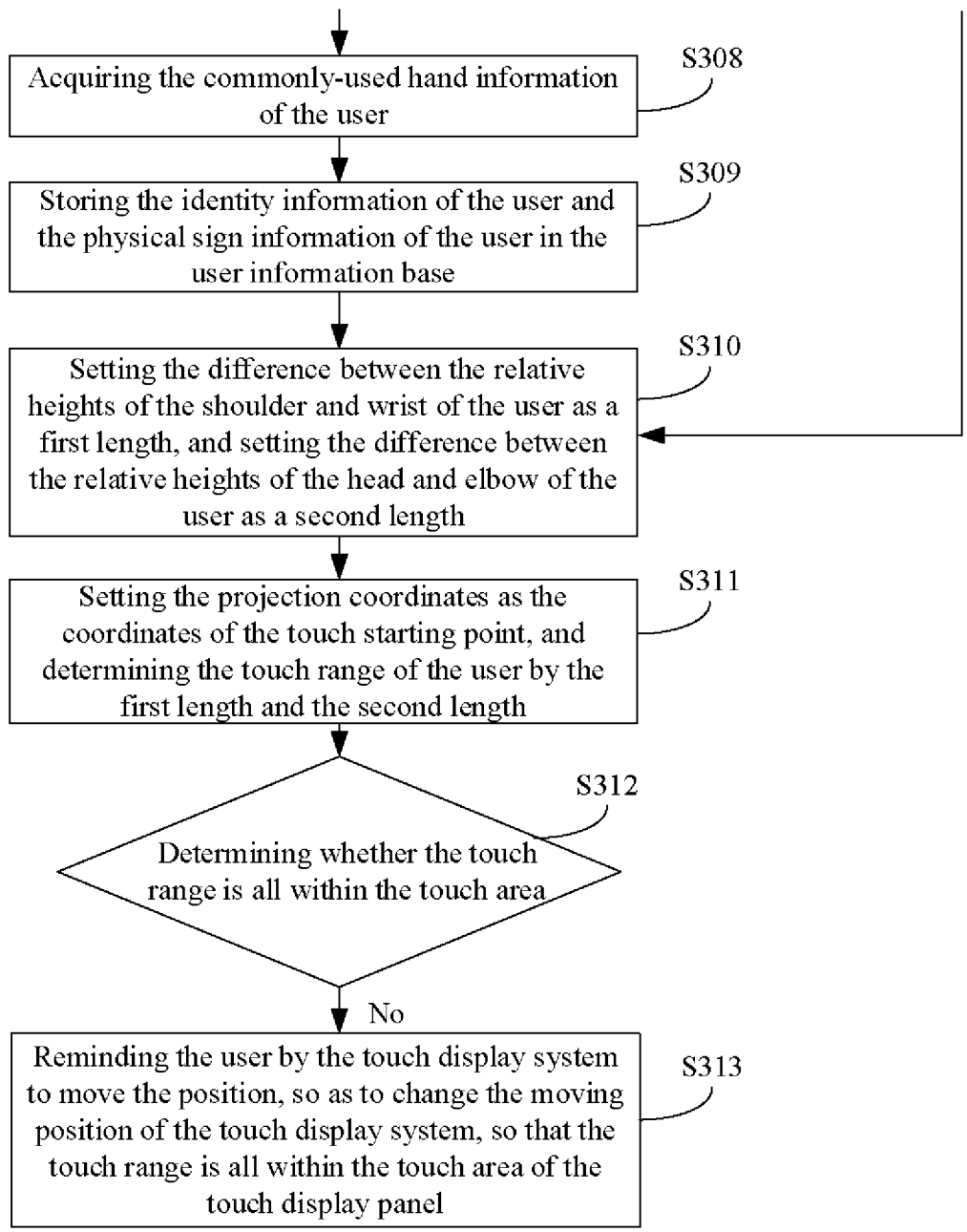

For example, as shown in FIGS. 8A and 8B, some embodiments of the present disclosure provide a control method of a touch display system. Similarly, the control method is applicable to a touch display system including a touch display panel. The touch display system is, for example, an upright touch screen, which is fixed on a bracket or hung on a vertical wall. Users can stand in front of the touch display system and use their hands or stylus to perform touch operations. The control method includes step S301 to step S313.

Step S301: acquiring an instruction for adjusting the touch range. For example, the user can select a touch-range adjustment mode through the touch display panel of the touch display system or other input devices (e.g., remote controller) to start the function of adjusting the touch range of the touch display system, so as to set an operation area for performing, for example, writing operations. For example, a button for controlling the adjustment mode of writing operation can be set on the touch display panel or other income devices, or a voice command recognition module can be set on the touch display system; for example, the writing mode can be entered by voice such as "Start writing mode", and the touch range can be adjusted first to facilitate writing operation. For example, the user can exit the adjustment mode of the writing operation after the writing operation is finished.

Step S302: acquiring user identity information. For example, the user's face image can be obtained by a camera, and the features of the face image can be obtained by image recognition method. For another example, during using the touch display system, the user can input the user's identification number in the user login interface displayed on the touch display panel of the touch display system. For another example, the user may also input the fingerprint information of the user in the fingerprint recognition area of the touch display system.

Step S303: matching the user identity information with the pre-stored user identity information in the user information base. For example, the features of the face image, the user's identification number, fingerprint information, etc., acquired in step S302 are matched with the user's identity information pre-stored in the user information base. If at least one item of the user identity information is successfully matched with the prestored user identity information, it can be determined that the physical sign information of the current user has been stored in the user information base, and then step S304 is entered. If the matching is unsuccessful, it can be determined that the physical sign information of the current user is not stored in the user information base, and then step S305 is entered.

Step S304: calling the user physical sign information prestored in the user information base to obtain the sign information of the user relative to the touch area. For example, the pre-stored user physical sign information includes the height Hp of the head top P of the user relative to the ground, the height Hs of the shoulder S of the user relative to the ground, the height He of the elbow E of the user relative to the ground, and the height Hw of the wrist W of the user relative to the ground. The height difference between the head top of the user and the elbow of the user is: $H_p-H_e$. The height difference between the shoulder of the user and the wrist of the user is: $H_s-H_w$. Then, step S310 is entered.

Step S305: obtaining the relative height of at least one of the head top, shoulders, elbows, and wrists of the user. For example, step S305 may further include step S306 and step S307.

Step S306: acquiring the user image information of the user in front of the touch display panel of the touch display system. For example, the user image information of the user in front of the touch display panel of the touch display system is acquired by at least one camera, and the horizontal distance d between the user and the touch display panel is acquired by a distance measuring device. For another example, the horizontal distance d between the user in front of the touch display panel and the touch display panel is calculated and obtained through at least two cameras simultaneously.

Step S307: obtaining the relative height of at least one of the head top, shoulders, elbows, and wrists of the user according to the user image information. For example, an image recognition method is used to determine the top of the user's head P according to the user image information acquired by the camera, calculate the included angle M of the head top P of the user relative to the camera N on the touch display system, and obtain the height Hp of the head top of the user relative to the ground according to the above formula (1). With the same method, the height Hs of the shoulder S of the user relative to the ground, the height He of the elbow E of the user relative to the ground, and the height Hw of the wrist W of the user relative to the ground, can be obtained.

Step S308: acquiring the commonly-used hand information of the user. If the user's commonly-used hand information is right handed, the touch starting point coordinate is the upper left vertex of the rectangular range, and if the user's commonly-used hand information is left handed, the touch starting point coordinate is the upper right vertex of the rectangular range.

S309: storing the identity information of the user and the physical sign information of the user in the user information base. In the case where users use the touch display system once, they can directly call the user physical sign information in the user information base by matching the identity information, thus saving the time needed for measurement and calculation.

Step S310: setting the difference between the relative heights of the shoulder and wrist of the user as a first length, and setting the difference between the relative heights of the head and elbow of the user as a second length. As shown in FIG. 3A and FIG. 3B, the height difference between the head top of the user and the elbow of the user is: $H_p-H_e$, and the height difference between the shoulder of the user and the wrist of the user is: $H_s-H_w$.

Step S311: setting the projection coordinates as the coordinates of the touch starting point, and determining the touch range of the user by the first length and the second length.

As shown in FIG. 3A and FIG. 3B, for example, in some examples, the touch range is located within the touch area 121. The touch range is rectangular. One side (e.g., the long side) of the rectangular range is parallel to the ground with the first length L1, and the other side is perpendicular to the ground with the second length L2. The upper vertex of the rectangular range is the projection coordinate P(X, Y) of the head top P of the user on the touch display system 10. The touch range can be determined as a rectangular area with the projection coordinate P(X, Y) of the head top P of the user on the touch display system 10 as the starting point (for example, the vertex of the upper left corner of the rectangle or the vertex of the upper right corner of the rectangle) and L1×L2 as the range.

S312: determining whether the touch range is all within the touch area. For example, if the touch range is not completely within the touch area of the touch display system, the process proceeds to step S313, and if the touch range is completely within the touch area, the user is allowed (for example, prompted) to start writing and other operations.

Step S313: reminding the user by the touch display system to move the position, so as to change the moving position of the touch display system, so that the touch range is, for example, all within the touch area of the touch display panel, thus realizing the integrated operation of touch and display. For example, the touch display system can send a voice reminder of the moving position to the user, or instruct the user to move the position in the form of an arrow, for example, on the touch display panel.

It should be noted that the order of multiple steps in the above embodiments is only exemplary, and the order of steps can be adjusted according to functional requirements, and the embodiments of the present disclosure are not limited to this.

In the case where there is a certain distance between the touch area where the user needs to write and the area where information is displayed in the touch display panel, the touch display system reminds the user (through display operations, such as arrows, indication signals, and voice prompts, etc.) that the position can be moved. In the case where the user moves the position, the touch area will also move with the user, so that the starting point of the touch area is always consistent with the head top of the user.

The following statements should be noted:

(1) The accompanying drawings involve only the structure(s) in connection with the embodiment(s) of the present disclosure, and other structure(s) can be referred to common design(s).

(2) In case of no conflict, the embodiments of the present disclosure and the features in the embodiments can be combined with each other to obtain new embodiments.

The above are merely specific implementations of the present disclosure without limiting the protection scope of the present disclosure thereto. Any person skilled in the art can easily think of changes or substitutions within the technical scope disclosed in the present disclosure, and they should be covered by the protection scope of the present disclosure. The protection scope of the present disclosure should be based on the protection scope of the appended claims.

What is claimed is:

1. A touch display system, comprising:
a touch display panel, comprising a touch area and configured to sense a touch operation of a user;
a controller, coupled with the touch display panel, configured to acquire a physical sign information of the user who is to operate the touch display panel, and adjust a touch range for the user to perform the touch operation in the touch area according to the physical sign information of the user, wherein the physical sign information comprises a relative height of each of a head top, shoulders, elbows, and wrists of the user relative to the ground,
wherein the controller is further configured for:
acquiring the relative height of each of the head top, the shoulders, the elbows, and the wrists of the user in front of a display side of the touch display panel relative to the ground;
according to the relative height of the head top, determining a same height position at the touch display panel relative to the ground, and setting the same height position as a display position corresponding to the head top;
setting a difference between the relative heights of the shoulders and the wrists of the user as a first length;
setting a difference between the relative heights of the head and the elbows of the user as a second length; and
setting the display position corresponding to the head top as adjusted touch starting point coordinate, and determining the touch range of the user by the first length and the second length,
wherein the touch range of the user comprises a rectangular range with the first length used as one side length and the second length used as an adjacent other side length, and the touch starting point coordinate used as an upper vertex of the rectangular range.

2. The touch display system according to claim 1, wherein the controller is further configured to determine the touch range according to projected positions of the physical sign information of the user on the touch display panel, and,
the physical sign information of the user comprises a relative height between the head top of the user and the ground.

3. The touch display system according to claim 1, wherein:
the controller is configured to acquire the physical sign information of the user proximal to the touch area in real time.

4. The touch display system according to claim 3, further comprising:
an image acquisition device, coupled to the controller and configured to acquire a user image information,
wherein the controller is configured to acquire the physical sign information of the user according to the user image information.

5. The touch display system according to claim 4, further comprising:
a distance measuring device, configured to obtain a horizontal distance between the user and the touch display panel,
wherein the controller is further coupled with the distance measuring device and configured to acquire the physical sign information of the user relative to the touch area according to the horizontal distance.

6. The touch display system according to claim 5, wherein:
the image acquisition device is further configured to acquire the user image information of the user, in front of a display side of the touch display panel, and
the controller is further configured to acquire the relative height of each of the head top, the shoulders, the elbows, and the wrists of the user relative to the ground according to the user image information.

7. The touch display system according to claim 6, wherein:
the distance measuring device is further configured to acquire one or more horizontal distances between the user in front of the touch display panel and one or more positions at the display side of the touch display panel, and
the controller is further configured to acquire the relative height of each of the head top, the shoulders, the elbows, and the wrists of the user relative to the ground according to the one or more horizontal distances and the user image information.

8. The touch display system according to claim 7, wherein:
the controller is further configured to determine, according to the user image information, a position information of each of the head top, the shoulders, the elbows, and the wrists of the user relative to the image acquisition device by using image recognition method, and obtain a relative position of the each of the head top, the shoulders, the elbows, and the wrists of the user relative to the ground according to the position information, the one or more horizontal distances between the user and the touch display panel, and a relative height of the image acquisition device relative to the ground.

9. The touch display system according to claim 7, wherein:
the distance measuring device comprises at least two cameras at different positions, and the at least two cameras are provided on the touch display panel and separated from each other, and
the controller is configured to calculate and acquire the one or more horizontal distances between the user in front of the touch display panel and the one or more positions at the display side of the touch display panel through user image information simultaneously captured by the at least two cameras.

10. The touch display system according to claim 1, wherein after determine the adjusted touch range, the controller is further configured to adjust, according to the position of the touch operation within the touch range, a display mode of content to be displayed in the touch range in response to the touch operation, in a case where the user performs the touch operation within the adjusted touch range.

11. The touch display system according to claim 10, wherein:
the controller is further configured to display a written content in a new line, in a case where the user performs a writing operation within the adjusted touch range and the written content, in the touch range is located at a boundary of the touch range.

12. The touch display system according to claim 10, wherein:
the controller is further configured to determine whether boundary coordinates of the adjusted touch range exceed the touch area,
in a case where the boundary coordinates of the adjusted touch range exceed the touch area, a reminding message is sent to remind the user to move a position of a body or an arm, and the rectangular range is re-determined, so that the touch range of the rectangular range is all within the touch area of the touch display panel.

13. The touch display system according to claim 1, wherein:
the physical sign information further comprises a commonly-used hand information of the user,
the controller is further configured to acquire the commonly-used hand information of the user,
in a case where the commonly-used hand information of the user is right handed, the touch starting point coordinate comprises an upper left vertex of the rectangular range, and in a case where the commonly-used hand information of the user comprises a left hand, the touch starting point coordinate comprises an upper, right vertex of the rectangular range.

14. The touch display system according to claim 1, further comprising: a storage device, wherein:
the storage device comprises a user information base, and the user information base comprises an identity information of the user and the physical sign information of the user, and
the identity information comprises an identity authentication information of the user, and the identity authentication information comprises a biometric information of the user or a password information for logging into a database.

15. The touch display system according to, claim 14, wherein:
the controller is further configured to acquire the physical sign information of the user prestored in the user information base.

16. The touch display system according to claim 15, wherein:
the controller is further configured to acquire the identity information of the user and the physical sign information corresponding to the identity information of the user, before acquiring the pre-stored physical sign information.

17. The touch display system according to claim 1, wherein:
the controller is further configured to start adjusting the touch range for the user who is to perform the touch operation in the touch area, according to an input instruction for adjusting the touch range called by the user.

18. A control method of a touch display system, the control method being adapted to a touch display system with a touch display panel and comprising:
acquiring a physical sign information of a user who is to operate the touch display panel, wherein the physical sign information comprises a relative height of each of a head top, shoulders, elbows, and wrists of the user relative to the ground;
according to the physical sign information of the user, adjusting a touch range for the user to perform a touch operation in the touch area of the touch display panel;
acquiring the relative height of each of the head top, the shoulders, the elbows, and the wrists of the user in front of a display side of the touch display panel relative to the ground;
according to the relative height of the head top, determining a same height position at the touch display panel relative to the ground, and setting the same height position as a display position corresponding to the head top;
setting a difference between the relative heights of the shoulders and the wrists of the user as a first length;
setting a difference between the relative heights of the head and the elbows of the user as a second length; and
setting the display position corresponding to the head top as adjusted touch starting point coordinate, and determining the touch range of the user by the first length and the second length,
wherein the touch range of the user comprises a rectangular range with the first length used as one side length and the second length used as an adjacent other side length, and the touch starting point coordinate used as an upper vertex of the rectangular range.

\* \* \* \* \*